United States Patent
Sera et al.

(10) Patent No.: US 11,563,327 B2
(45) Date of Patent: Jan. 24, 2023

(54) FLEXIBLE AND EFFICIENT SWITCHED STRING CONVERTER

(71) Applicant: AALBORG UNIVERSITET, Aalborg (DK)

(72) Inventors: Dezso Sera, Paddington (AU); Laszlo Mathe, Budapest (HU); Mattia Ricco, Bologna (IT)

(73) Assignee: KK WIND SOLUTIONS A/S, Ikast (DK)

( * ) Notice: Subject to any disclaimer, the term of this patent is extended or adjusted under 35 U.S.C. 154(b) by 12 days.

(21) Appl. No.: 17/271,641

(22) PCT Filed: Aug. 30, 2019

(86) PCT No.: PCT/DK2019/050255
§ 371 (c)(1),
(2) Date: Feb. 26, 2021

(87) PCT Pub. No.: WO2020/043258
PCT Pub. Date: Mar. 5, 2020

(65) Prior Publication Data
US 2021/0328496 A1     Oct. 21, 2021

(30) Foreign Application Priority Data

Aug. 31, 2018  (DK) .......................... PA 2018 70564

(51) Int. Cl.
*H02J 7/02*     (2016.01)
*H02M 1/00*    (2006.01)
(Continued)

(52) U.S. Cl.
CPC .............. *H02J 3/381* (2013.01); *H02J 3/007* (2020.01); *H02J 7/02* (2013.01); *H02M 1/007* (2021.05);
(Continued)

(58) Field of Classification Search
CPC .... H02M 1/0095; H02M 1/007; H02M 1/009; H02M 1/00951; H02M 1/0091; H02J 7/02; H02J 2207/20
See application file for complete search history.

(56) References Cited

U.S. PATENT DOCUMENTS 8,872,384 B2 * 10/2014 Stratakos ................ H02J 3/381
                                                                307/104
9,515,568 B2 * 12/2016 Zhang ................... H02M 1/0095
(Continued)

FOREIGN PATENT DOCUMENTS

CA       2896922 A1 *  1/2016
CN    103782471 A  *  5/2014  .............. H02J 3/381
(Continued)

OTHER PUBLICATIONS

English translation of "CN 103782471", BHOWMIK, Solar Photovoltaic Energy Collection And Conversion System And Method Aug. 22, 2017 (Year: 2017).*

(Continued)

*Primary Examiner* — Sisay G Tiku
(74) *Attorney, Agent, or Firm* — Pearne & Gordon LLP

(57) ABSTRACT

The application relates to an electric converter for converting AC or DC input into an electric AC or DC output. A swap circuit with controllable electric switches serves to selectively swap connection of a plurality of DC power banks (DCBs) between an input terminal and an output terminal, thus selectively connecting the DCBs to an electric source or an electric load. The DCBs are formed as series of interconnected submodules (SMs) each having electric energy storage elements (ESEs) and a switching circuit for selectively by-passing or connecting the ESEs. By properly controlling the swap circuit and the switching of the SMs, (Continued)

the converter can be used for DC-AC, DC-DC, AC-DC, or AC-AC conversion, allowing multilevel output.

18 Claims, 19 Drawing Sheets

(51) Int. Cl.
    *H02J 3/38*         (2006.01)
    *H02J 3/00*         (2006.01)
    *H02M 7/483*       (2007.01)

(52) U.S. Cl.
    CPC ......... *H02M 1/009* (2021.05); *H02M 1/0095* (2021.05); *H02M 7/4835* (2021.05); *H02J 2207/20* (2020.01)

(56) References Cited

U.S. PATENT DOCUMENTS

| | | | |
|---|---|---|---|
| 2002/0140294 A1* | 10/2002 | Iwata | H02J 3/1807 307/103 |
| 2012/0120698 A1* | 5/2012 | Viitanen | H02M 7/487 363/126 |
| 2012/0243282 A1* | 9/2012 | Marquardt | H02M 7/49 363/132 |
| 2014/0347898 A1* | 11/2014 | Raju | H02M 1/32 363/35 |
| 2015/0123612 A1* | 5/2015 | Ide | H02M 7/155 363/67 |
| 2015/0162848 A1 | 6/2015 | Harnefors et al. | |
| 2015/0200602 A1* | 7/2015 | Narimani | H02M 1/12 363/37 |
| 2016/0020628 A1* | 1/2016 | Guo | H02M 7/537 307/72 |
| 2016/0020705 A1 | 1/2016 | Dong et al. | |
| 2018/0062514 A1* | 3/2018 | Dong | H02J 7/34 |
| 2018/0205240 A1 | 7/2018 | Sadilek et al. | |
| 2020/0195165 A1* | 6/2020 | Shinoda | H02M 7/2173 |

FOREIGN PATENT DOCUMENTS

| | | | | |
|---|---|---|---|---|
| CN | 107534437 A | * | 1/2018 | |
| CN | 109088559 A | * | 12/2018 | ............ H02M 7/487 |
| CN | 110062990 A | * | 7/2019 | .............. H02J 1/001 |
| CN | 110235351 A | * | 9/2019 | ............ H02M 1/088 |
| CN | 106104722 B | * | 6/2020 | |
| CN | 113615066 A | * | 11/2021 | .......... H02M 3/1582 |
| EP | 911950 A2 | * | 4/1999 | ............ H02M 7/487 |
| EP | 2456059 A1 | * | 5/2012 | ............ H02M 7/003 |
| EP | 2924867 A1 | * | 9/2015 | ............ H02M 7/217 |
| EP | 2975749 A1 | * | 1/2016 | .............. H02M 1/32 |
| EP | 3295552 B1 | * | 5/2021 | ............ H02M 7/483 |
| EP | 3507883 B1 | * | 7/2021 | .............. H02J 1/001 |
| GB | 2541428 A | * | 2/2017 | ................ H02J 3/36 |
| GB | 2586632 A | * | 3/2021 | ............ H02M 7/483 |
| JP | 2002359929 A | * | 12/2002 | ............ H02J 3/1807 |
| WO | WO-2012176006 A1 | * | 12/2012 | ........ H02M 3/33507 |
| WO | WO-2013107782 A2 | * | 7/2013 | .............. H02J 3/383 |
| WO | WO-2014023334 A1 | * | 2/2014 | ............ H02J 3/1814 |
| WO | WO-2014181081 A1 | * | 11/2014 | ................ H02J 3/32 |
| WO | WO-2018034711 A2 | * | 2/2018 | ................ H02J 1/10 |
| WO | WO-2018044359 A2 | * | 3/2018 | .............. H02J 1/001 |
| WO | WO-2021248223 A1 | * | 12/2021 | |

OTHER PUBLICATIONS

English translation of "CN 106104722" MADAVARAK, Multi-level Converter, Nov. 9, 2016 (Year: 2016).*
International Search Report issued in Patent Application No. PCT/DK2019/050255 dated Nov. 29, 2019.
Written Opinion issued in Patent Application No. PCT/DK2019/050255 dated Nov. 29, 2019.

* cited by examiner

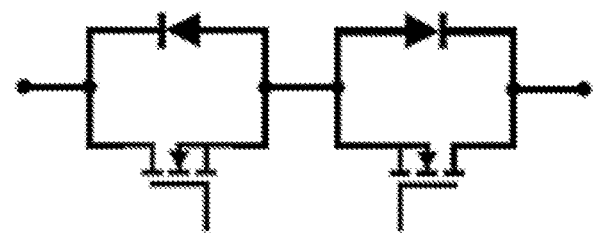
FIG. 6
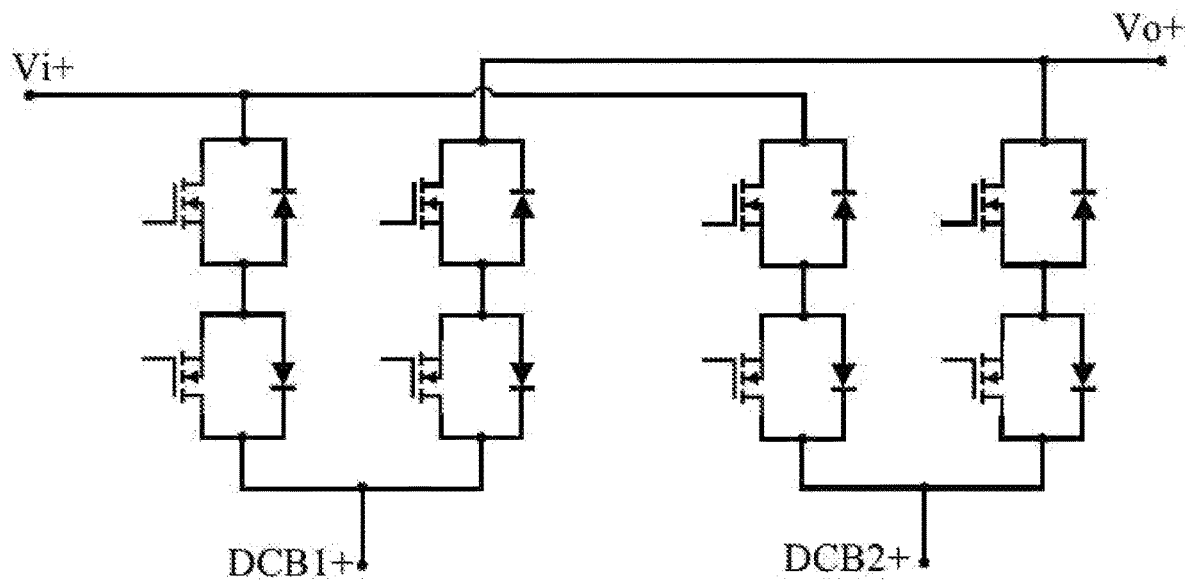
FIG. 7
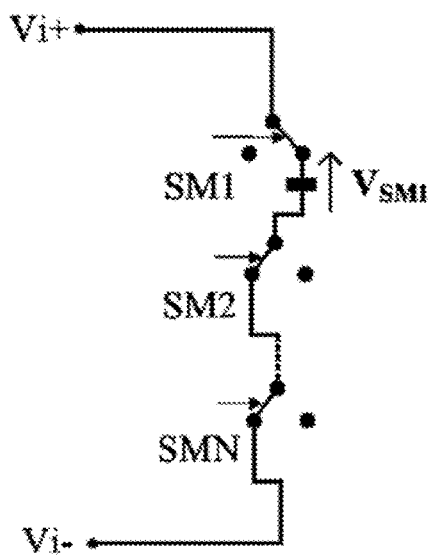
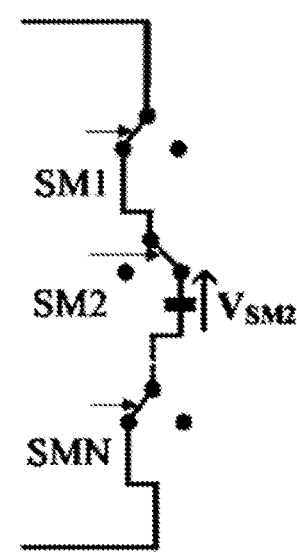
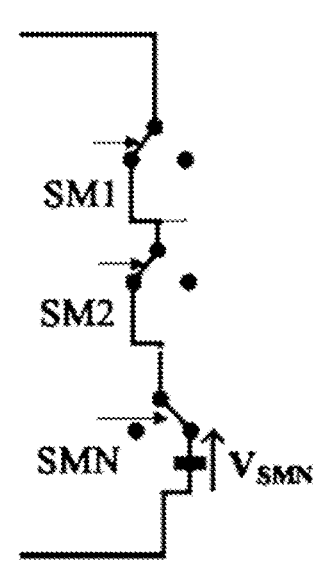
FIG. 8a    FIG. 8b    FIG. 8c

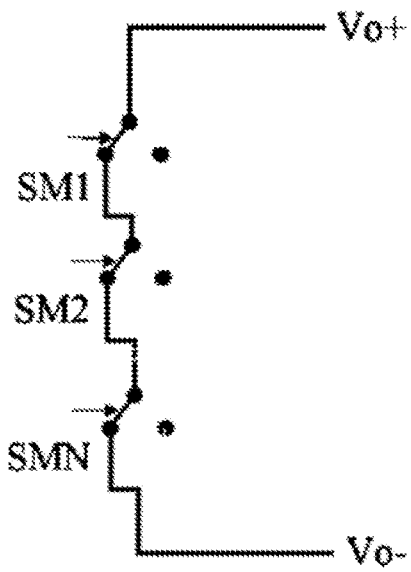
FIG. 9a
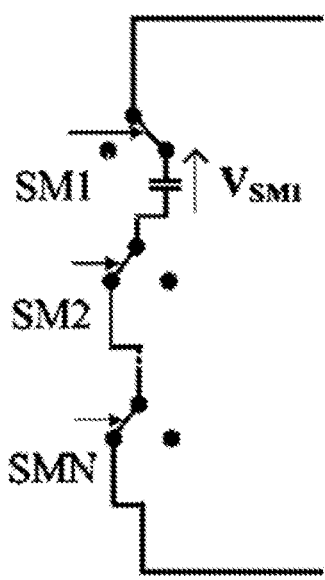 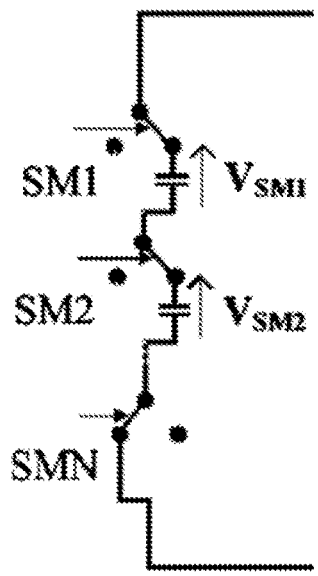 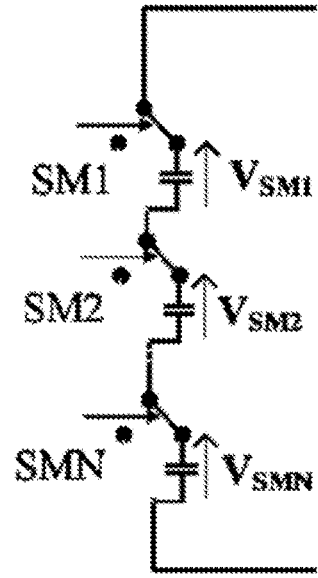
FIG. 9b  FIG. 9c  FIG. 9d
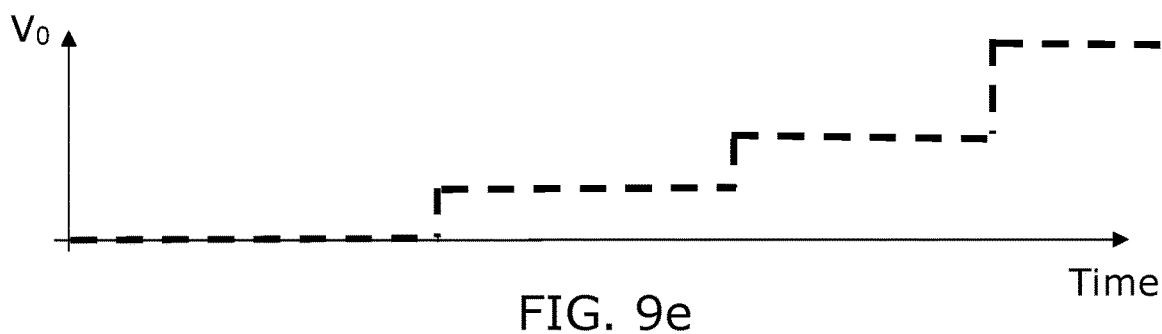
FIG. 9e

FLEXIBLE AND EFFICIENT SWITCHED STRING CONVERTER

FIELD OF THE INVENTION

The present invention relates to the field of power electric system, more specifically the invention provides an electric converter topology with a high efficiency, e.g. for use in DC to AC conversion of electric power from photovoltaic elements. The converter topology provides easy integration with electric energy storage elements, e.g. batteries.

BACKGROUND OF THE INVENTION

Efficient electric converters are important, e.g. for converting electric power from renewable energy sources, such as photovoltaic elements or wind turbine generators. Such converters should in addition be low cost, compact and with a low weight.

E.g. conversion from a DC voltage from a photovoltaic element to an AC voltage for application to an AC grid typically requires several conversion stages, and thus often leads to a complex and bulky design. The function of converting a DC input voltage to a higher AC output voltage is typically realized using a two-stage conversion, where a DC-DC boost stage is followed by a DC-AC conversion. Two-stage grid connected Photo Voltaic (PV) inverters, e.g. string and micro-inverters, can be considered as typical applications for such architecture.

SUMMARY OF THE INVENTION

Thus, according to the above description, it is an object of the present invention to provide a high efficient and yet compact and simple to implement electric converter.

In a first aspect, the invention provides an electric converter arranged to convert an electric AC or DC input at an input terminal into an electric AC or DC output at an output terminal,
- a switching arrangement comprising a plurality of controllable electric switches for establishing controllable electric connection between the input terminal and a plurality of DC power bank terminals and between the output terminal and the plurality of DC power bank terminals,
- a plurality of DC power banks connected to the respective DC power bank terminals, wherein the plurality of DC power banks comprise respective pluralities of series interconnected submodules, wherein each submodule comprises one or more electric energy storage elements and a switching circuit comprising at least one controllable electric switch for selectively by-passing or connecting the electric energy storage elements, and
- a control system comprising a processor configured
  - to execute a first control algorithm for controlling the switching arrangement to switch between a plurality of states for charging and discharging the plurality of DC power banks in an alternating manner, wherein in a first state the switching arrangement is controlled to connect the input terminal to a first DC power bank terminal, and to connect a second DC power bank terminal to the output terminal, and wherein in a second state the switching arrangement is controlled to connect the input terminal to a second DC power bank terminal, and to connect the first DC power bank terminal to the output terminal, and
  - to execute a second control algorithm for individually controlling the switching circuits of the submodules of the plurality of DC power banks for selectively connecting a series of one or more of the electric energy storage elements in the plurality of DC power banks individually.

Basically, the proposed electric converter is based on two key parts: (i) two or more strings of electric energy storage elements (ESEs), i.e. DC power Banks (DCB), and (ii) a switching circuit that can individually connect these DCBs to either the input or to the output of the converter, referred to in the following as a swap circuit (SWC). The DCBs are strings of ESEs which ensure the energy transfer in the converter. Each bank is composed of a number of fundamental units called Sub-Modules (SM), each comprising an energy storage element (ESE), such as a capacitor or a battery or similar, and a switching circuitry (SC), which allows bypassing the ESE or inserting it in the circuit. The swap circuit can especially be a set of single pole double throw (SPDT) switches, one for each DCB, however it is to be understood that different topologies can be adopted to serve this task.

It is to be understood that a plurality of DCBs can be connected to each DCB terminal, if preferred.

The converter transfers energy from the input to the output by first connecting (via the SWC) one or more of the DCBs in parallel to the input, charging the ESEs, then connecting them to the output of the converter and discharging the ESEs. In a basic form, the converter contains two DCBs connected alternatively to the input and to the output to charge and then discharge the ESEs. This allows continuous energy transfer from the input to the output.

Such electric converter is advantageous, since it provides a high efficiency and yet it is possible to provide in a compact design, since it is formed by rather simple components. Further, the design provides a high versatility due to the possibility of accepting a wide input voltage range. The topology can further provide an output voltage in the form of a DC output, a dual level output, or a multilevel output, depending on the control algorithms only. AC to AC or DC to AC or AC to DC may be possible without an additional unfolding converter. Still further, the topology allows electric input-output isolation, as well as a low EMI signature. Especially, the switching arrangement may include switches to provide switching of both positive and neutral/negative terminals, so input and output terminals can be completely decoupled.

Further, an important feature of the electric converter is the straightforward integration of energy storage due to the submodules with a plurality of electric energy storage elements. The electric energy storage elements can be implemented as e.g. battery cells or modules, supercaps (super capacitors), etc. in the converter structure. The energy storage industry is growing extremely fast and is becoming increasingly popular in connection with e.g. renewables such as wind and solar, to compensate for their fluctuating generation profile. The fast-growing Electric Vehicle (EV) market is another important driver for the energy storage industry.

Considering that batteries typically need their own charging/discharging power electronic converters, the electric converter according to the invention provides an effective integration of these converters/batteries, and thus provides an improved efficiency and lower cost, e.g. for existing renewable or EV drive converters.

In the following, preferred features and embodiments will be described.

The wherein the second control algorithm may be arranged for controlling the switching circuits of the submodules for selectively, e.g. alternatingly, connecting a series of one or more of the electric energy storage elements in the plurality of DC power banks to provide a multilevel voltage output from the plurality of DC power banks.

The electric converter may comprise an unfolding converter connected to the output terminal for generating a sinusoidal electric output in response to a voltage generated at the output terminal.

The first and second control algorithms are preferably arranged to control switching operation in response to a voltage at the input terminal. The control algorithms preferably operate with more input voltages, e.g. a reference voltage or a reference voltage value, as well as voltages associated with the ESEs of the submodules, and further as well a voltage at the output terminal. Especially, it is preferred that the second control algorithm is arranged to control switching operation of the switching circuits of the submodules in response to a measure of energy stored in the individual ESEs. Especially, the measure of energy stored in the individual electric energy storage elements is preferably based on measured voltages across the individual ESEs.

The second control algorithm may be arranged to adjust switching operation of the switching circuits of the submodules in response to the measure of energy stored in the individual ESEs, so as to balance ageing and/or variations due to tolerances of the individual ESEs. This may be to balance ageing of ESEs within each submodule or among the submodules of a DCB, or balancing of ageing of all DCBs.

The second control algorithm may be arranged to control switching operation of the switching circuits of the submodules upon discharging to the output terminal, so as to stepwise increase or decrease of the voltage at the output terminal, thus hereby generating a multi-level output voltage at the output terminal. This may, especially in combination with e.g. full bridge switching topology in the SMs, allow elimination of an unfolding converter to generate a sufficient AC voltage for many AC loads, e.g. with a filter involving an inductor at the output terminal.

In some embodiments, each submodule of at least one of the plurality of DCBs, such as all DCBs of the converter, comprises a switching circuit serving to connect the electric energy storage element in a full bridge topology. Alternatively or additionally, this switching circuit may be configured for connecting the electric energy storage element in a half bridge topology.

Especially, it may be preferred that all the submodules of the plurality of DCBs have identical topologies.

The electric converter may comprise at least 3 DCBs, such as 3-100 DCBs, such as 3-50 DCB s, such as 10-50 DCBs. The DCBs being connected to respective DCB terminals.

The ESE of at least one SM, such as all SMs, of at least one of the DCB may comprise a capacitor. Especially, the ESE of the SMs of at least one of the DCBs may comprise a capacitor. The ESE of at least one SM of at least one of the DCBs may comprise a battery, especially a rechargeable type battery.

The ESE of at least one SM of at least one DCB may comprise a fuel cell.

It is to be understood that the DCBs may be formed by SMs which are composed of different types of ESEs, e.g. a blend of one or more DCB based on capacitor or supercaps based DCB and another one or more DCB based on batteries, while other DCBs may be formed by fuel cells. Thus, the converter topology is suitable for integration with various forms of ESEs. Especially, one of the DCBs may comprise an electric energy storage element comprising a capacitor, and at least one submodule of the first DC power bank comprises an electric energy storage element comprising a battery.

The DCBs may each comprise at least 32 SMs, such as 3-100 SMs, such as 3-50 SMs, such as 3-20 SMs, such as 3-10 SMs, such as 3-16 SMs.

The ESEs may each have a voltage range of 1-400 V, such as 20-400V, such as 50-400V, such as 1-100 V, such as 10-100 V, such as 20-50 V.

The DCBs may each be controlled to provide 2-100 different output voltage levels, e.g. 5-16 different output voltage levels, i.e. by selective series connection of one or more ESEs each SM. Alternatively, the DCBs may each be controlled to provide a fixed or substantially fixed output voltage level, e.g. with the purpose of generating a stable DC voltage at the output terminal.

The electric converter may be arranged to convert: a DC input into an AC output, a DC input into a DC output, an AC input into a DC output, or an AC input into an AC output.

The switching arrangement may be operated at a switching frequency of 0.1 Hz to 10 kHz, more preferably such as 0.1 Hz to 3 kHz, such as 10 Hz to 500 Hz, such as 50 Hz to 200 Hz. It is to be understood that the switching frequency is preferably designed or varied in accordance with the charging and discharging timing of the ESEs of the DCBs. The switching circuits of the SMs may especially be operated at a switching frequency of 0.1 Hz to 20 kHz. The actual switching frequency depends on a number of parameters, as known by the skilled person.

In some embodiments, the electric converter comprises at least four DCBs, and wherein the electric converter is configured for three-phase electric conversion, i.e. comprising three output terminals.

The electric converter may comprise one or more inductors serving as electric filter component at an input and/or output and/or between two DCBs, e.g. between an electric source and the input terminal and/or between output terminal and an electric load, such as an electric grid.

The electric converter is to be understood to be dimensioned for a large variety of applications, such as from micro converter applications e.g. for fitting in a series and/or parallel connection of a plurality of photovoltaic elements, or for larger electric power sources. Especially, the electric converter may be dimensioned to output at least an electric power of 10 W, such as at least 100 W, such as at least 500 W, such as at least 1 kW, such as at least 50 kW.

In preferred embodiments, the first control algorithm involves a maximum power point (MPP) tracking algorithm for operating the switching arrangement to obtain an optimal electric power from an electric source connected to the input terminal.

The controllable electric switches of the SWC may be four-quadrant switches, such as known in the art.

Especially, controllable electric switches may include one or more of: an insulated gate bipolar transistor (IGBT) module, a MOSFET, a GTO, an IGCT, and/or comprising power electronic switches based on silicon carbide (SiC) or gallium nitride (GaN) technologies.

The electric converter may comprise a plurality of output terminals, such as separate output terminals for separate electric loads.

In preferred embodiments of the first control algorithm, a switching sequence involves sub sequences serving to take into account a dead-time for the plurality of controllable electric switches of the switching arrangement, i.e. the necessary time between turning off one and turning on another controllable electric switch. During dead-time, both switches are off. The dead-time is in fact given for the logical control signals of the switches, and must take into account both gate circuit characteristics (driver and other delays, gate signal rise-time etc.) as well as the semiconductor switch's and load characteristics, so as to ensure that one switch is completely off before the other starts conducting.

Preferably, the first control algorithm and the switching circuit is furthermore designed to ensure a current path (or freewheeling) for the input terminal and the output terminal during a dead-time period for the controllable electric switches. Thus, preferably, the switching (or swap switching sequence) of the first control algorithm takes into account the mentioned dead-time to avoid shoot-through or short-circuit between the terminals of the circuit, while at the same time ensuring a freewheeling path for both currents from the input and output terminals.

In preferred embodiments, the method takes advantage of the possibility to individually control the semiconductor devices within bidirectional switches, where each bidirectional switch can e.g. be built of two MOSFETs connected face-to-face. Each bi-directional switch can take 4 different states: Full conduction (both directions), full blocking (both directions), and two unidirectional conductions (conduction one way, blocking the other or vice versa).

The most preferred swap switching sequence will ensure that during the swap procedure each bidirectional switch is put in the correct state such that both dead-time is taken into account as well as ensuring that the requirement of a current path for the input and output terminals, as mentioned, is fulfilled.

In a preferred embodiment, the plurality of controllable electric switches comprises:
 a first controllable bidirectional switch for establishing controllable electric connection between the input terminal and a first DC power bank,
 a second controllable bidirectional switch for establishing controllable electric connection between the output terminal and the first DC power bank,
 a third controllable bidirectional switch for establishing controllable electric connection between the input terminal and a second DC power bank, and
 a fourth controllable bidirectional switch for establishing controllable electric connection between the output terminal and the second DC power bank.

Especially, each of said controllable bidirectional switches may comprise a series connection of first and second controllable electric switches. Especially, each of the first and second controllable electric switches are shunted by respective first and second diodes, wherein the first and second diodes are connected to conduct current in opposite directions. These diodes serve to ensure a current path during the dead-time periods of the switching sequence. In case of a MOSFET switch, the diodes are part of the semiconductor switch (body diode). In preferred implementations, the first and second controllable electric switches are implemented by respective semiconductor switches with opposite polarity (i.e. mounted face-to-face), such as MOSFET switches. In preferred embodiments, the first control algorithm involves a switching sequence comprising four states for switching each of the bidirectional switches, for switching between the first and second states, involving a dead-time in the switching sequence. Especially, the first control algorithm and the switching circuit may be designed to ensure a current path for both the input terminal and the output terminal during a dead-time period for the controllable electric switches.

In a second aspect, the invention provides a power electric system comprising an electric converter according to the first aspect. Especially, the power electric system may comprise a photovoltaic source connected to the input terminal of the electric converter, and wherein the output terminal is connected to apply electric power to an AC electric grid.

Alternatively, such system may comprise one or more other electric sources may be connected to the input terminals. Especially, the electric converter is suitable for converting electric power from a plurality of different types of electric sources such as sustainable energy sources and batteries etc.

The system may comprise a plurality of cascased electric converters according to the first aspect.

In a third aspect, the invention provides a method for converting an electric AC or DC input to an electric AC or DC output, the method comprising
 providing a plurality of DC power banks comprising respective pluralities of series interconnected submodules, wherein each submodule comprises electric energy storage elements and a controllable switching circuit for selectively by-passing or connecting the electric energy storage elements,
 charging and discharging the plurality of DC power banks in an alternating manner by controlling a controllable switching arrangement with a first control algorithm, and
 selectively connecting a series of one or more of the electric energy storage elements in the DC power banks individually by means of operating the controllable switching circuits according to a second control algorithm.

In a fourth aspect, the invention provides use of the electric converter according to the first aspect for DC to AC conversion, for DC to DC conversion, for AC to DC conversion, or for AC to AC conversion.

In a fifth aspect, the invention provides use of the electric converter according to the first aspect for converting electric energy from an electric source being one of:
 a photovoltaic element, a wind turbine generator, a wave generator, a battery system, fuel cell, combustion engine generator, or electric grid, etc.

It is to be understood that the same advantages and preferred embodiments and features apply for all the mentioned aspects, as described for the first aspect, and the aspects may be mixed in any way.

BRIEF DESCRIPTION OF THE FIGURES

The invention will now be described in more detail with regard to the accompanying figures of which
FIGS. 6 and 7 show examples of controllable switch elements,
FIGS. 8 and 9 illustrate examples of charging and discharging of DCBs.

The figures illustrate specific ways of implementing the present invention and are not to be construed as being limiting to other possible embodiments falling within the scope of the attached claim set.

DETAILED DESCRIPTION OF THE INVENTION

Figure 1:
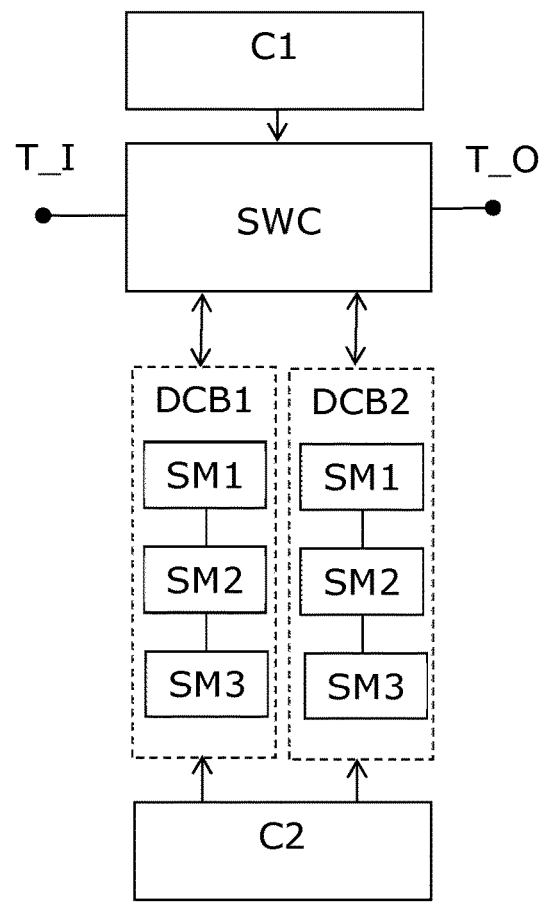
FIG. 1 illustrates basic elements of an embodiment with two DC power Banks (DCBs)

FIG. 1 illustrates an electric converter embodiment with two DC power Banks (DCBs) DCB1, DCB2. The converter is arranged to convert an electric AC or DC input at an input terminal T_I into an electric AC or DC output at an output terminal T_O. A switching arrangement SWC or swap circuit with a plurality of controllable electric switches which are controlled by a first control algorithm C1. The swap circuit SWC is controlled to establish electric connection between the input and output terminals T_I, T_O and the two DCB1, DCB2 in an alternating manner, so that the DCB1 is charged by connection to the input terminal T_I in one time period, while discharged by connection to the output terminal T_O another time period. The same applies to DCB2 which is connected for charging and discharging in opposite intervals as that of DCB1. This can be implemented with a rather simple swap circuit SWC with only few controllable electric switches.

The DCBs DCB1, DCB2 each comprise respective pluralities of series interconnected submodules (SMs) SM1, SM2, SM3. Each SM SM1, SM2, SM3 comprises one or more electric energy storage elements ESEs, e.g. capacitors or batteries of a combination of these, and a switching circuit comprising at least one controllable electric switch for selectively by-passing or connecting the ESEs. The switching functions of the SMs SM1, SM2, SM3 of DCB1, DCB2 are controlled by a second control algorithm C2. Thus, each DCB DCB1, DCB2 can be controlled either for generating a fixed target voltage upon discharging of the ESEs by appropriate series connection of the SMs, or alternatively, the SMs SM1, SM2, SM3 can be controlled to provide multi-level discharging. The same applies for the charging process.

The control system serving to implement the first and second control algorithms C1, C2 may comprise a single processor serving to implement both control algorithms C1, C2, however two separate processors can be used, if preferred.

The electric converter may be used as a DC-AC or AC-DC or DC-DC or AC-AC converters. It is to be understood that the electric converter can be formed by various technologies. In preferred versions, the converts CNV1, CNV2 comprise a control circuit for controlling switching of a plurality of electric switches, e.g. IGBTs.

Figures 2A, 2B:
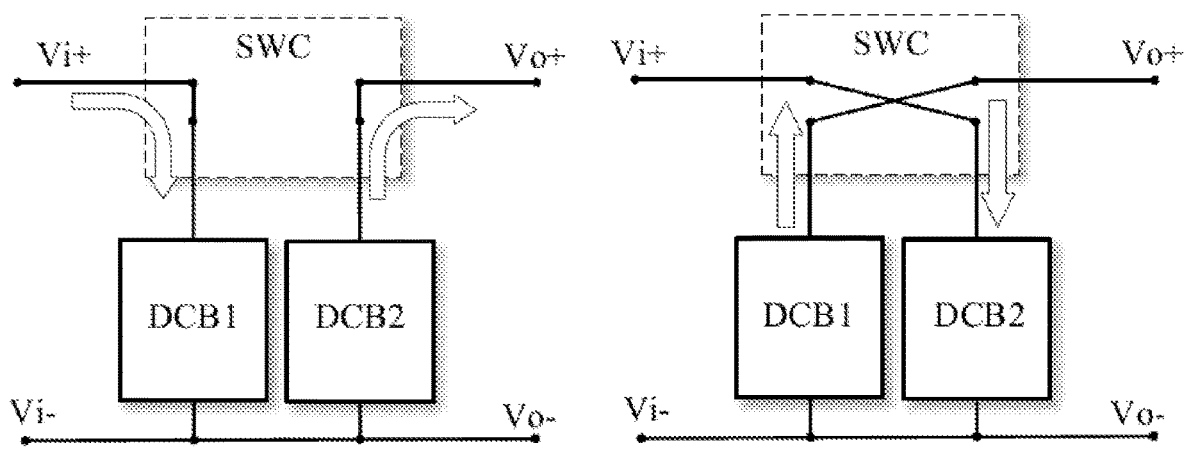
FIG. 2 illustrates swapping between two DCBs.

FIGS. 2a and 2b show the function of the swap circuit SWC, e.g. for the embodiment of FIG. 1. In FIG. 2a the swap circuit SWC is in one state, where the two bidirectional switches connect the input terminal Vi+ to DCB1 for charging from a source connected to Vi+, while DCB2 is connected to the output terminal Vo+ for discharging. In FIG. 2b the swap circuit connects DCB1 to the output terminal Vo+ for discharging, while DCB2 is connected to the input terminal Vi+ for charging. The switching between the two states can preferably be controlled in response to sensed voltages of the ESEs of the DCBs DCB1, DCB2. Especially, the two DCBs DCB1, DCB2 may be identical, however they may be non-identical.

Figure 2C:
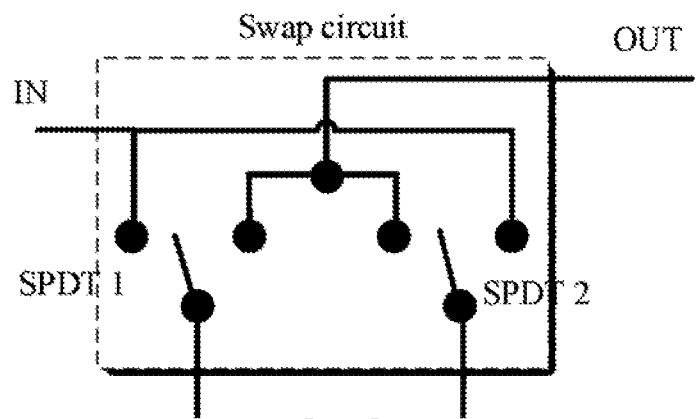
Figure 3A:
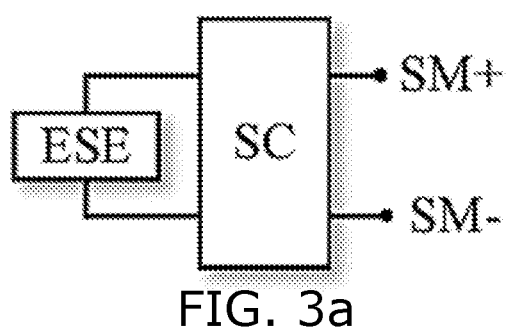
FIG. 3 illustrates different submodule topologies.
Figure 3B:
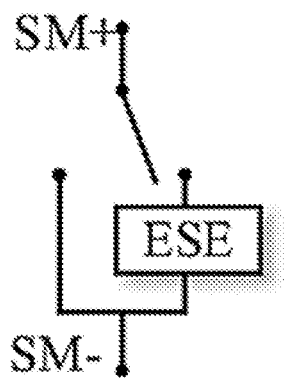
Figure 3C:
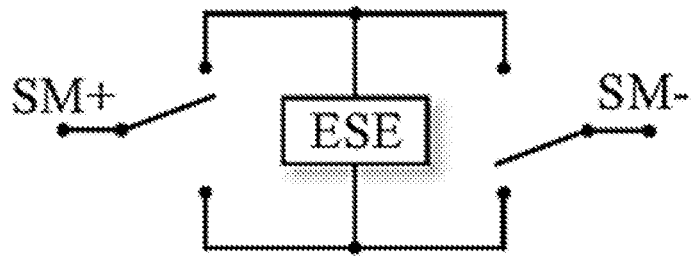
Figure 3D:
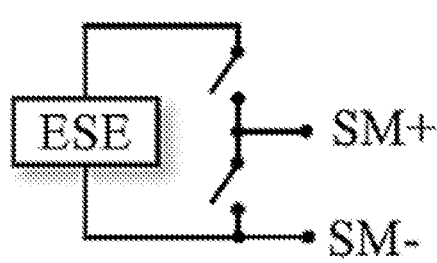
Figure 3E:
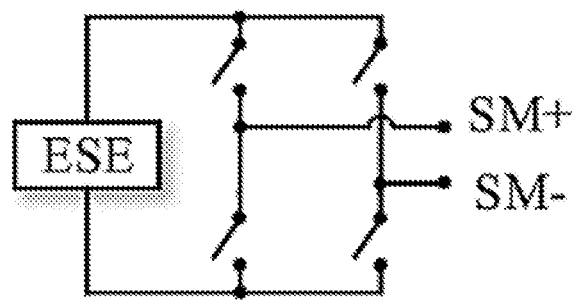

FIG. 2c shows an alternative way of implementing the swap circuit SWC by two Single Pole Double Throw (SPDT) switches SPDT1, SPDT2 per DCB, in case of single input single output.

FIGS. 3a-3e illustrate possible implementations of one SM with a switching circuit SC and an ESE. The aim of the SM switching circuit SC is to insert or bypass the ESE in the circuit. Different possible realizations can be adopted as seen in FIG. 3a-3e. A full-bridge circuit can also be used, where an output of the SM can be either 0 or ± the voltage of the ESE, e.g. using MOSFETS. It allows to directly achieve an AC voltage in output without requiring additional stages. Each MOSFET must block only the nominal ESE voltage and not the sum of the output and input voltage by making the choice of low-voltage low-resistance MOSFET possible. However, they must be able to handle the maximum current that flows in the converter. Another possibility is to adopt a half-bridge circuit. In this case the output of the SM can only be 0 or $+V_{ESE}$ and each MOSFET must block the nominal ESE voltage. With this solution the converter output can only generate DC voltage.

Figure 4A:
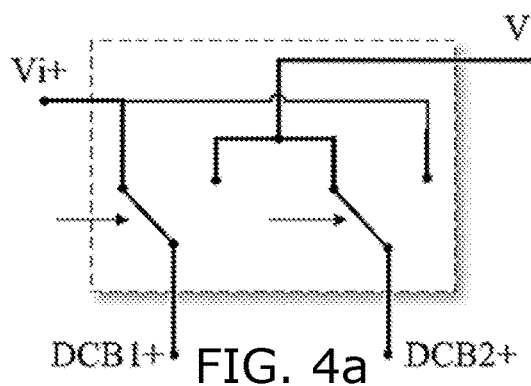
FIGS. 4 and 5 illustrate swap circuit topologies.
Figure 4B:
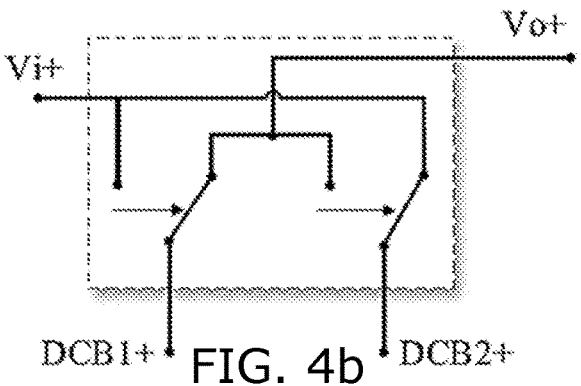
Figure 4C:
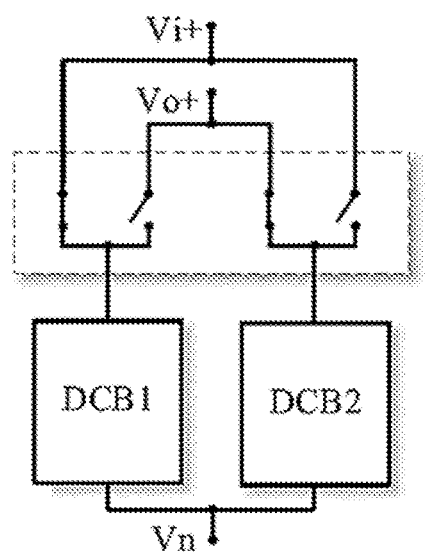
Figure 4D:
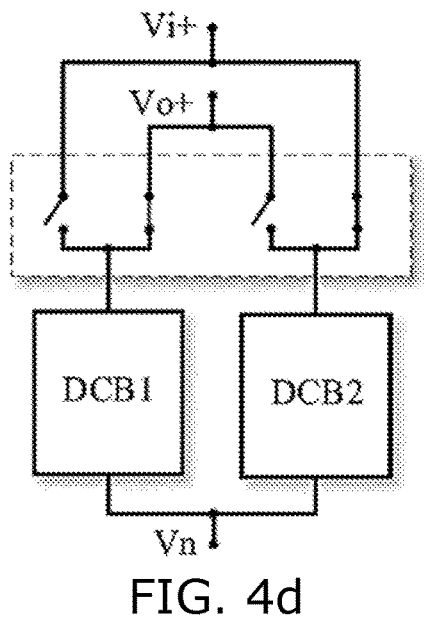

FIG. 4a-4d show different implementation of the swap circuit in case of a converter with a single input and a single output and with two DCBs and with use of SPDT switches. In FIG. 4a DCB1 is connected to the input while DCB2 is connected to the output, and in FIG. 4b the DCBs are swapped. FIGS. 4c and 4d show use of on/off switches for the swap circuit.

Figure 5A:
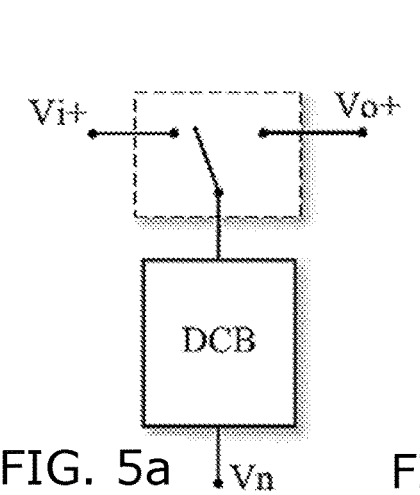
Figure 5B:
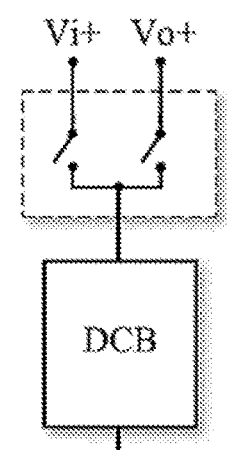
Figure 5C:
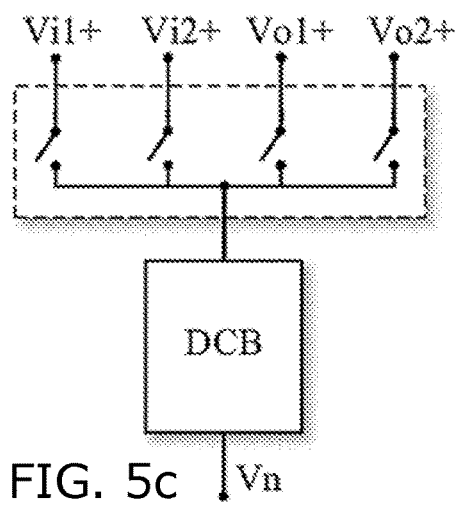
Figure 5D:
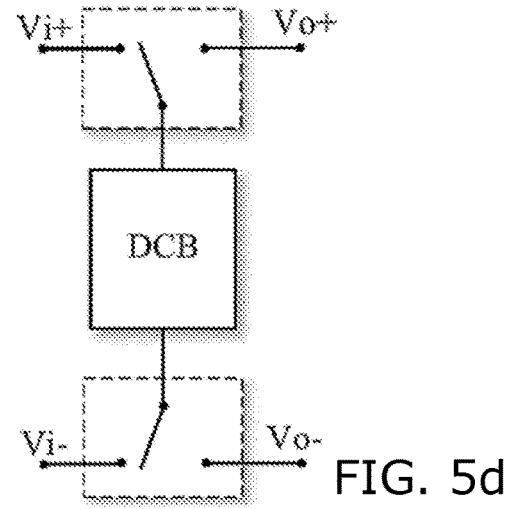
Figure 5E:
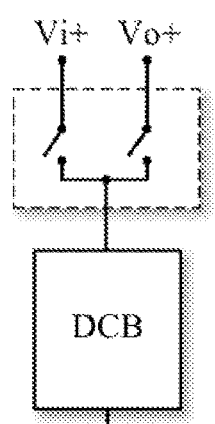
Figure 5E:
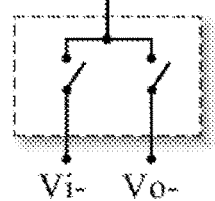
Figure 5F:
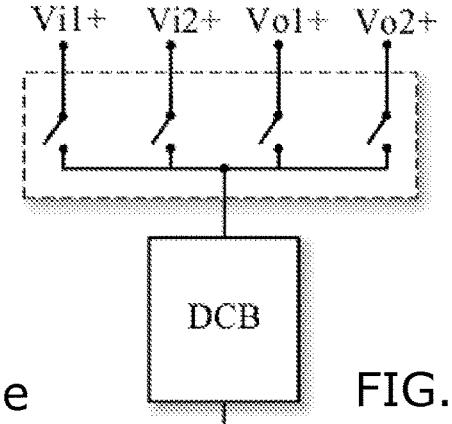
Figure 5F:
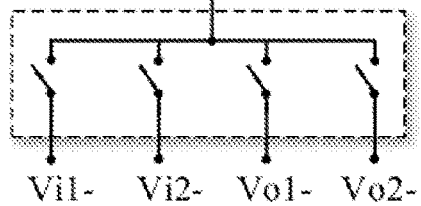

FIG. 5a-5f illustrate the concept of providing a converter with different swap circuits for implementing different numbers of inputs and outputs. FIG. 5a shows implementation of one input to one output by use of an SPDT switch, while FIG. 5b shows its realization using ideal on/off switches. FIG. 5c shows an extension for multiple input-multiple output systems, here shown as two inputs and two outputs. In case the inputs and outputs are independent, another swap circuit can be added to the bottom as shown in FIGS. 5d, 5e, and 5f.

DCBs have typically several, 3-20 SMs connected in series. The number of SMs (N) can be selected based on the application requirements. An example of selecting N is given in:

$$\begin{cases} N = \text{round}\left(\dfrac{V_{out,max}}{V_{in,min}}\right) & \text{boost} \\ N = \text{round}\left(\dfrac{V_{in,max}}{V_{out,min}}\right) & \text{buck} \end{cases}$$

Here $V_{out,max}$ and $V_{out,min}$ are the maximum and the minimum of the output voltage range, and $V_{in,max}$ and $V_{in,min}$ are the maximum and minimum of the input voltage range, respectively. Some possible realizations of the two main elements of the SM (the switching network and the ESE) are given here. In order to ensure continuous energy transfer, at least two DC banks are required, as previously mentioned. However, the number of DC banks can be relatively freely chosen depending on the application requirements etc. For example, three-phase output voltage is possible by using the appropriate number of DC banks. In this case 4 DCBs could ensure continuous energy transfer—at any given time, one DC bank is connected to the input, while three are connected to the output.

In analogue manner, multi-phase output is possible, as well as multi-input and/or multi-output configuration can be created if the required number of DCBs is available. This of course requires that the swap circuit is adopted to the specific case. For example, in case the inputs/outputs need to have independent neutral point, swap circuit is needed both at the top and bottom of the DCBs, as seen e.g. in FIGS. 5d, 5e and 5f.

FIG. 6 shows a possible implementation of a so-called four quadrant switch by anti-series of two MOSFETs. As known in the art, a four quadrant switch can be implemented in a number of other variants. Such switch type can be used in the swap circuit as well as in the switching circuit of the SMs.

FIG. 7 shows a possible single input and single output swap circuit implementation in case of two DCBs.

In FIG. 8a the ESE of SM1 is charged, while the switches of SM2 and SMN provide a by-passing. In FIG. 8b the ESE of SM2 is charged, while in FIG. 8c the ESE of SMN is charged.

The charging process is the process of charging the DCB(s) by connection to the converter input terminal. The charging procedure is affected by input voltage level, number of SMs within the DCBs, type of input (i.e. current- or voltage source), type of ESEs, boost or buck function, etc.

FIGS. 8a-8c illustrates the sequential charging procedure for SMs SM1, SM2, SMN each containing an ESE in the form of a capacitor, and in the case where the input voltage is DC and the converter is in boost mode. In this case, the capacitors are sequentially connected to the input in sub-groups (that can be from one to N capacitors from the string) to charge them to a desired value. The number of ESEs connected to the input at a given time depends on the relation between the input voltage and the average ESE voltage, as well as the required function to be performed e.g. boost or buck.

This results in a maximum boost ratio of N, i.e. Vout max=Vin*N. In case the required output voltage is lower than the input one, the charging procedure can be modified. For example, it is possible to have all the capacitors connected in series during the charging time by achieving a capacitor voltage equal to VDC/N. By inserting fewer capacitors in output, a lower voltage can be achieved. The maximum buck ratio for this case is 1/N, i.e. Vout min=Vin/N. When all of the ESEs are charged to the desired value, the DCB can be connected to the output for the discharging. A balancing technique, like the ones used in MMC, is implemented in order to balance the voltages of the ESEs within the DCB.

FIGS. 9a-9e illustrate a possible discharging procedure creating various output voltage levels by varying the number of ESEs connected in series, as seen in FIGS. 9a to 9d, starting with a pure short-circuit generating zero output voltage Vo, while successively more SMs are series connected to provide higher output voltage levels Vo. The result as seen in FIG. 9e is a stepwise increase in output voltage Vo as a function of time.

For an AC output, the well-known Nearest Level Control (NLC) or Phase Shifted carrier PWM (PSC-PWM) can be adopted providing the number of SMs required for achieving the right output voltage. The selection of these required SMs is performed accordingly to the capacitor voltages in order to balance them. For this purpose, a sorting algorithm can be adopted and the SMs with the highest voltage can be inserted when the current is negative (the capacitors are discharging). The SMs with the lowest voltage are inserted when the current is positive (the capacitors are charging from the grid).

If a DC voltage is required, a different modulation technique must be adopted. The balance of the ESE voltages is preferably anyway to be ensured.

The converter topology allows integration of different ESEs, such as batteries and super capacitors etc. In this case this new element replaces the capacitor in one or more SM. It is only required to take into account the management system for the ESE. During charging, the ESE can be permanently connected to the input as soon as its DCB is in charging mode. When the DCB is swapped to the output, for example when the capacitor voltages of the other DCB have reached the lower threshold, the ESE can be bypassed to avoid the discharging. In this way, the energy elements are charged up. When they have to be discharged, instead of connecting them to the input, they are connected to the output.

Figure 10:
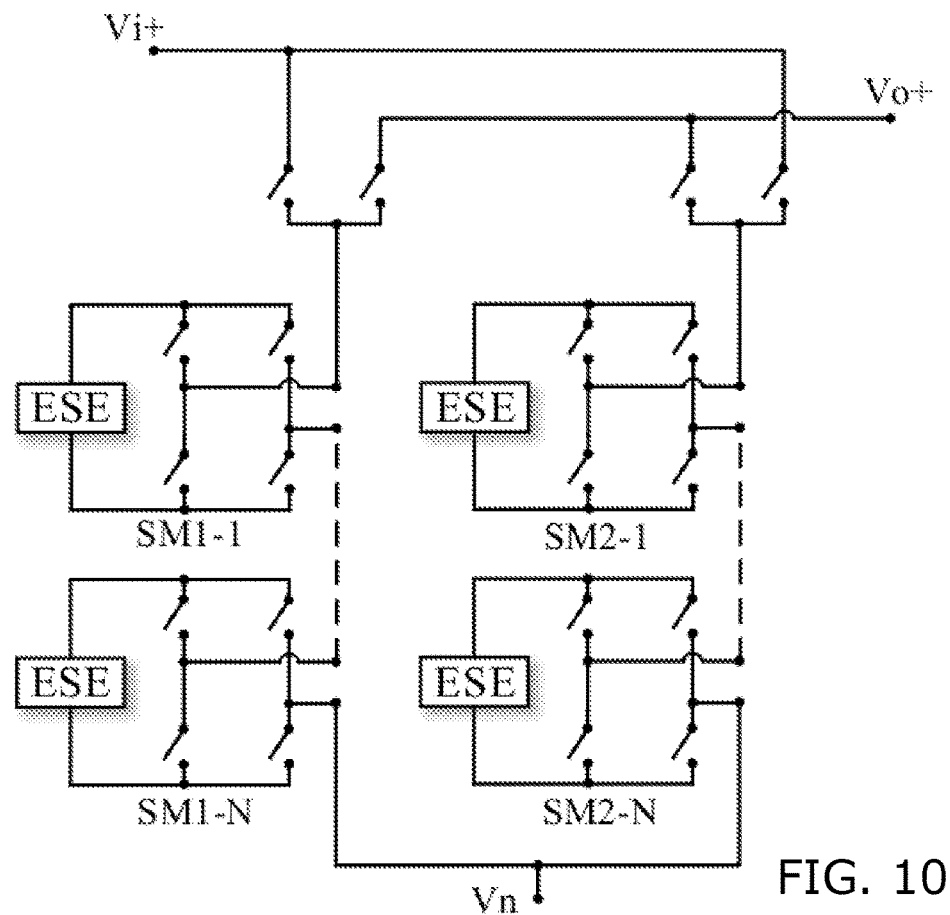
FIGS. 10-13 illustrate various converter embodiment topologies.

FIG. 10 illustrates a single input single output bi-directional DC-AC or AC-AC embodiment with two DCBs each having N SMs with one ESE each. The SMs are based on a full bridge switching circuit.

Figure 11:
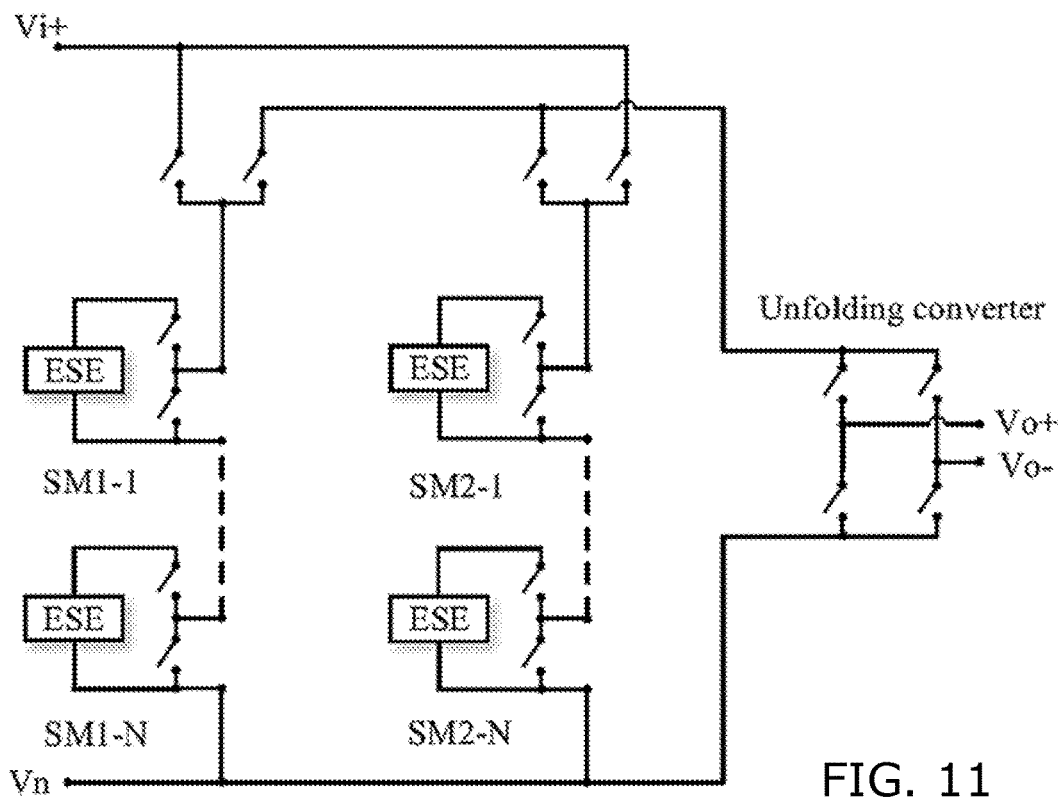

FIG. 11 illustrates a DC-AC embodiment with SMs using half bridge switches and an unfolding converter connected at the output of the swap circuit. The unfolding converter can be used to provide a sinusoidal output when for example a half-bridge topology is adopted as SM switching circuit and AC output is needed. This converter will need to switch only at the output voltage fundamental frequency, however PWM operation is also possible.

Figure 12:
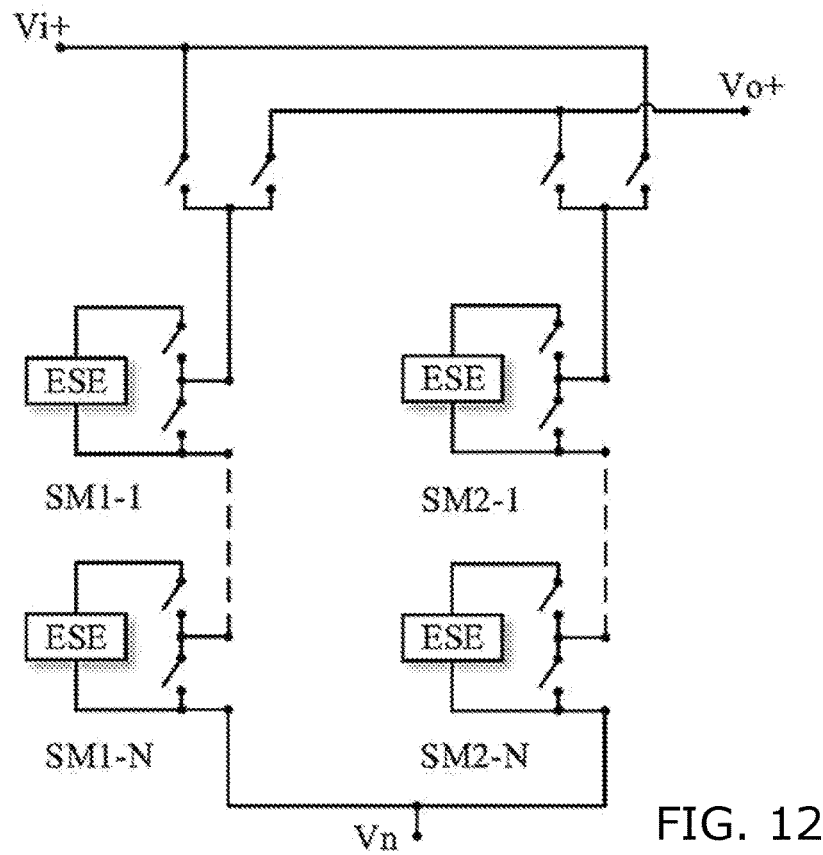

FIG. 12 illustrates a DC-DC embodiment based on half bridge SMs.

Figure 13:
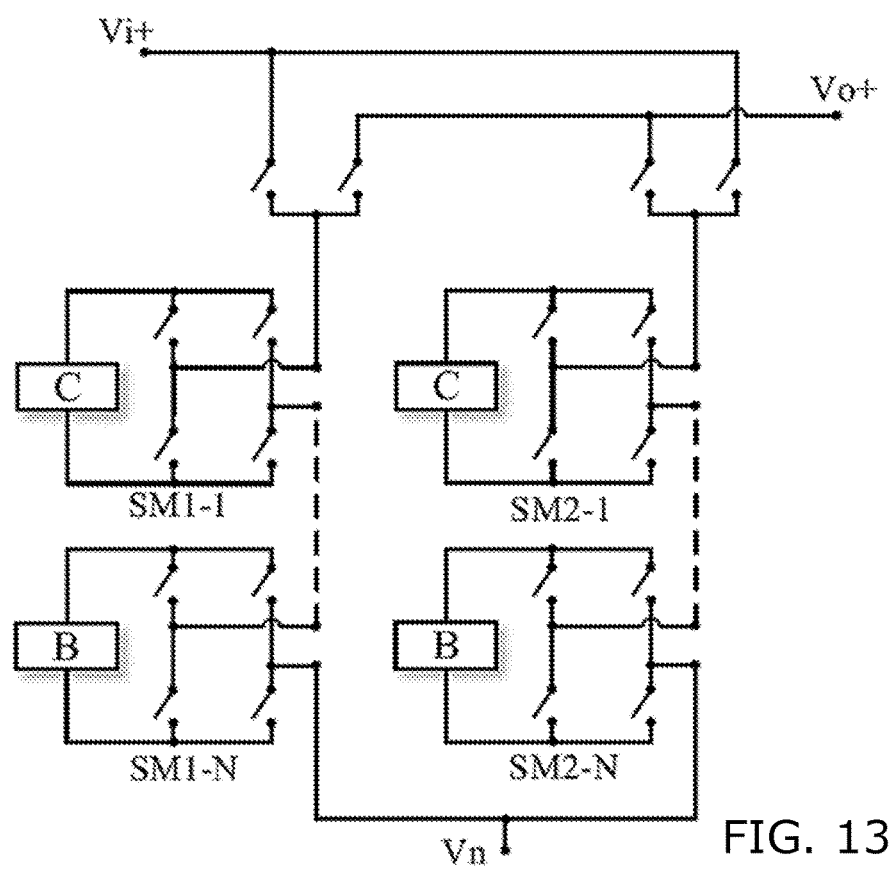

FIG. 13 illustrates an embodiment where the ESE of one or more SMs are a combination of capacitors C and batteries or super capacitors B. This allows integration of the converter with battery storage of electric energy.

Figure 14:
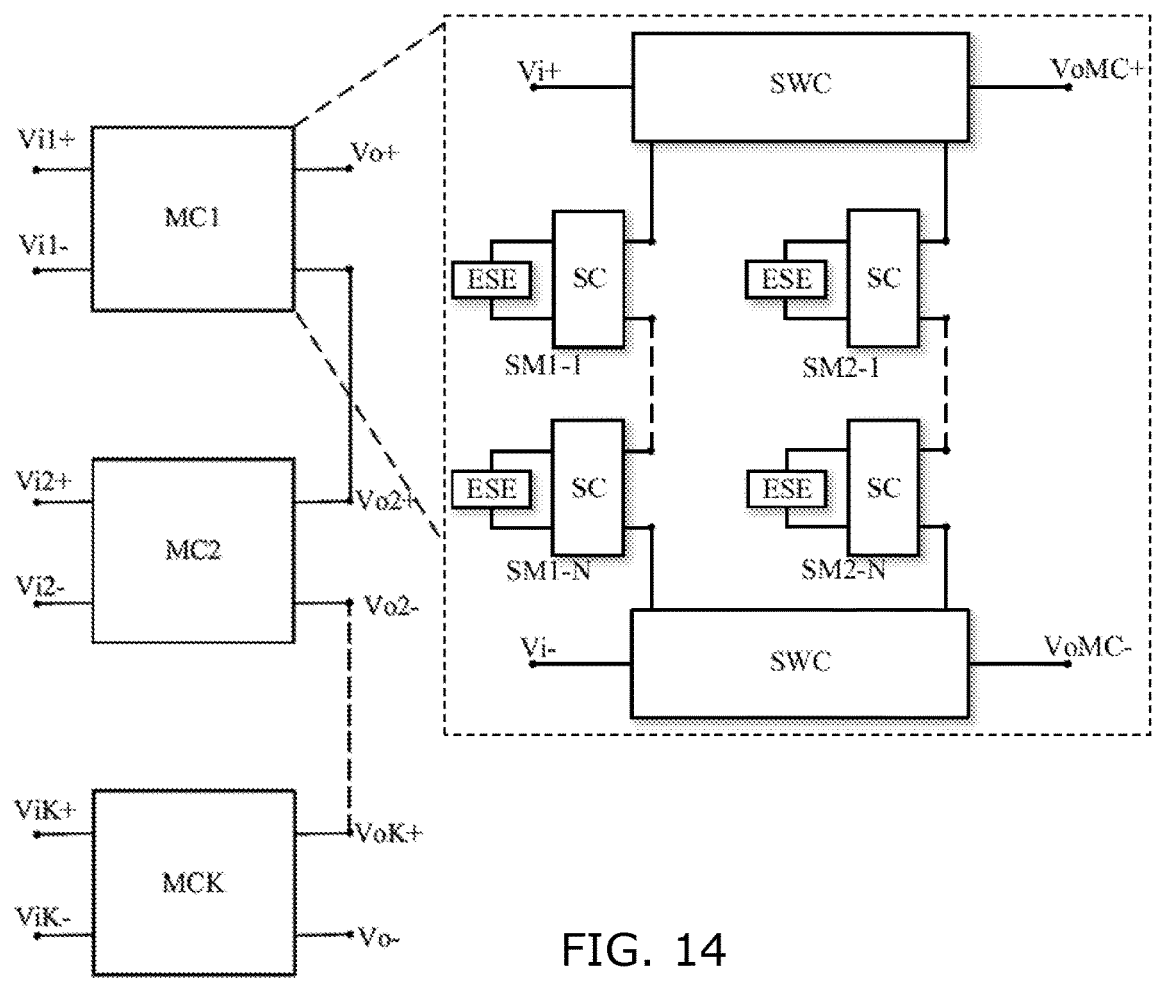
FIG. 14 illustrates cascading of converters.

FIG. 14 illustrates an embodiment with a cascade of K micro converters, each implemented as shown to the right for MC1, i.e. with two DCBs each having N SMs each having one ESE.

Figure 15:
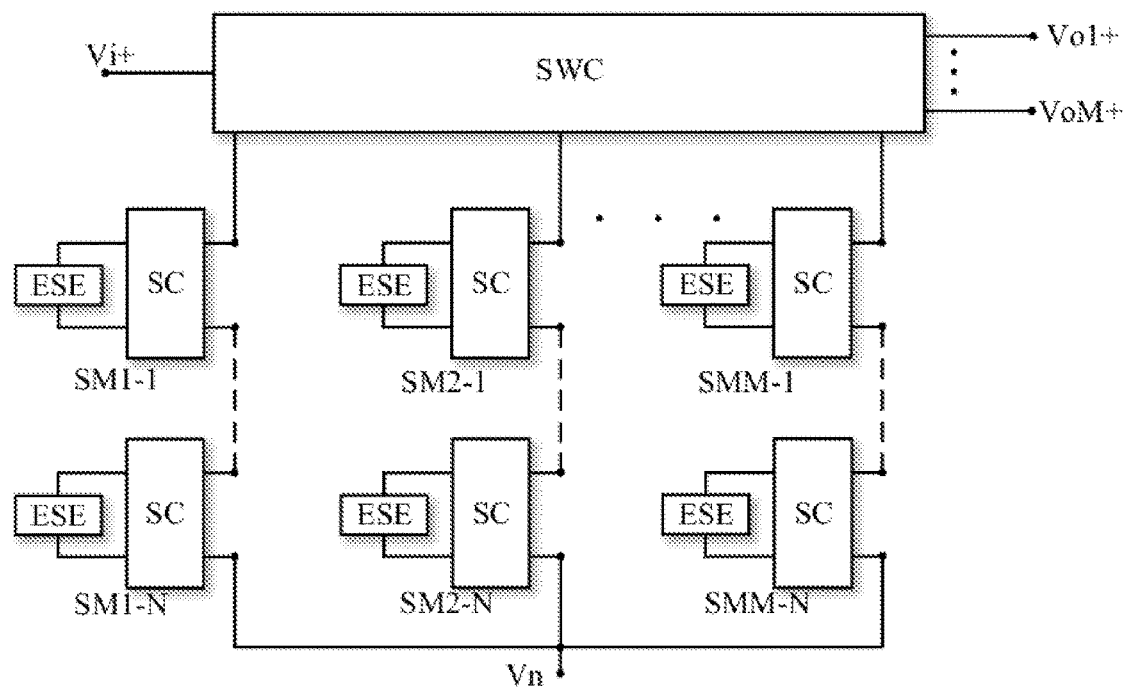
FIG. 15 illustrates a multiple output embodiment.

FIG. 15 illustrates an embodiment with a swap circuit SWC having one input and M outputs. The swap circuits serves to selectively connect M DCBs each having N SMs each with one ESE.

Figure 16A:
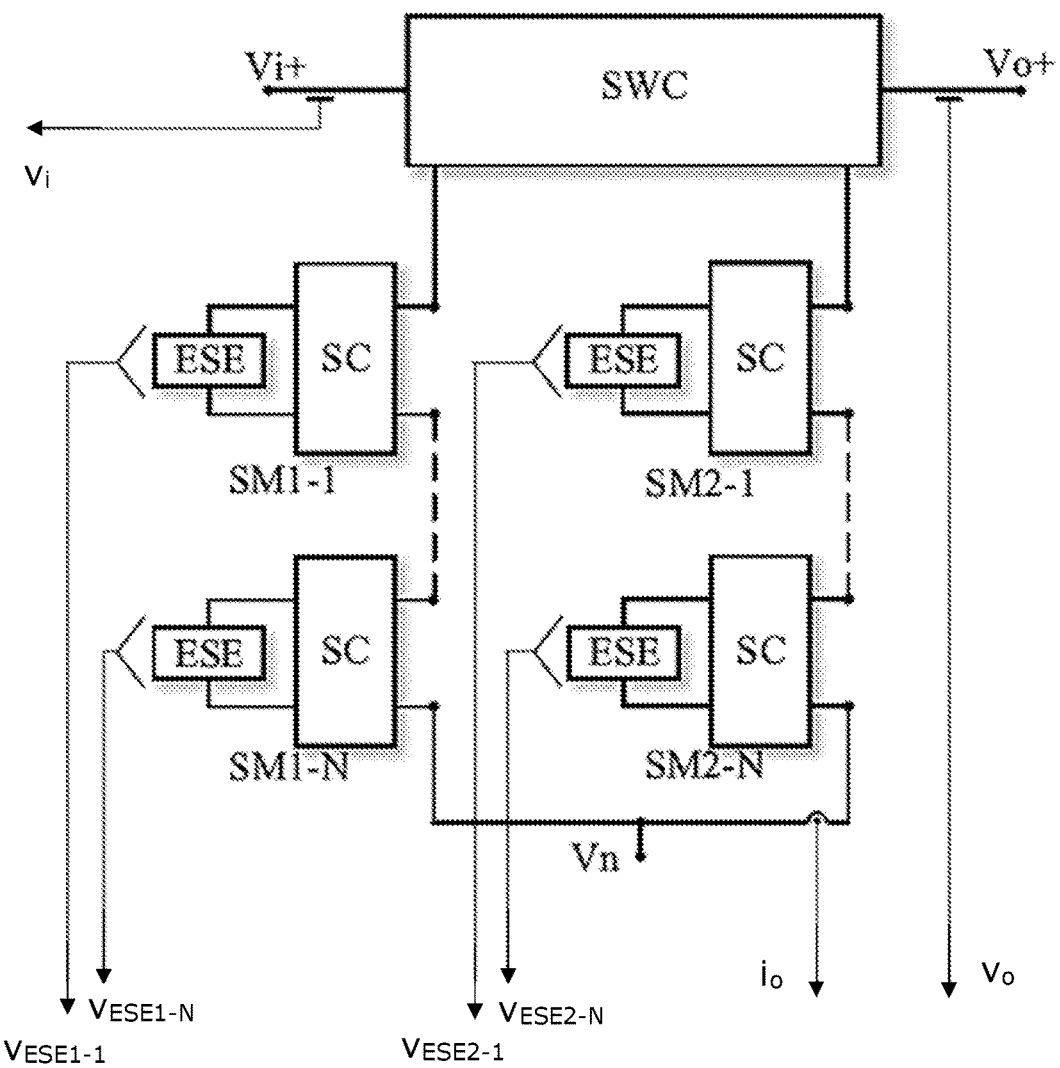
FIG. 16-18 illustrate converter controls.
Figure 16B:
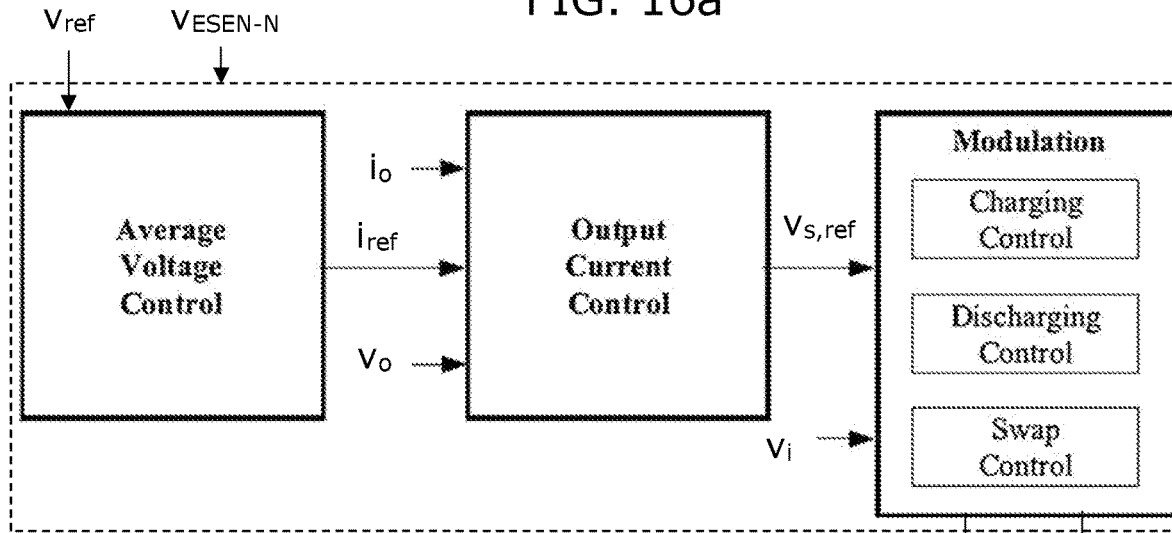

Similarly to a generic power electronic converter, a control system is required to ensure correct operation, according to the application requirements, i.e. to generate the gate control signals $g_{SWC}$ and $g_{SC}$ for the swap circuit and for the switching circuits in the SMs. An example of a simplified control system is shown in FIGS. 16a and 16b for the case of a single input, single output embodiment with two DCBs each with N SMs. The main parts of the control system for the proposed converter concept can be summarized as:

Energy balancing/average ESE voltage control. This control loop has essentially the same role as the DC link voltage control in a classical back-to-back or dual-stage converter.

Output current control—depending on the type of load, e.g. whether it is DC or AC, or the converter is grid feeding.

Modulation strategy—the charging and discharging procedure of the DCBs, as well as the swap circuit.

One of the features of the proposed converter is the power decoupling among the DCBs. This allows to independently control the DC banks and simplifying the overall control structure.

Especially, the voltages across each ESE, denoted $V_{ESEN-N}$, are detected and provided as input along with a reference voltage $V_{ref}$ and output current $i_o$ and output voltage $V_o$.

The objective of the control system is to provide energy balancing to maintain the energy level of the ESEs at a reference level. In case of the ESEs being based on capacitors, the amount of stored energy in the capacitors is directly proportional to their voltage. Therefore, controlling their voltage level $V_{ESEN-N}$ also controls their energy level. The capacitor voltages are measured, and an average voltage is obtained by considering both banks.

Figure 17:
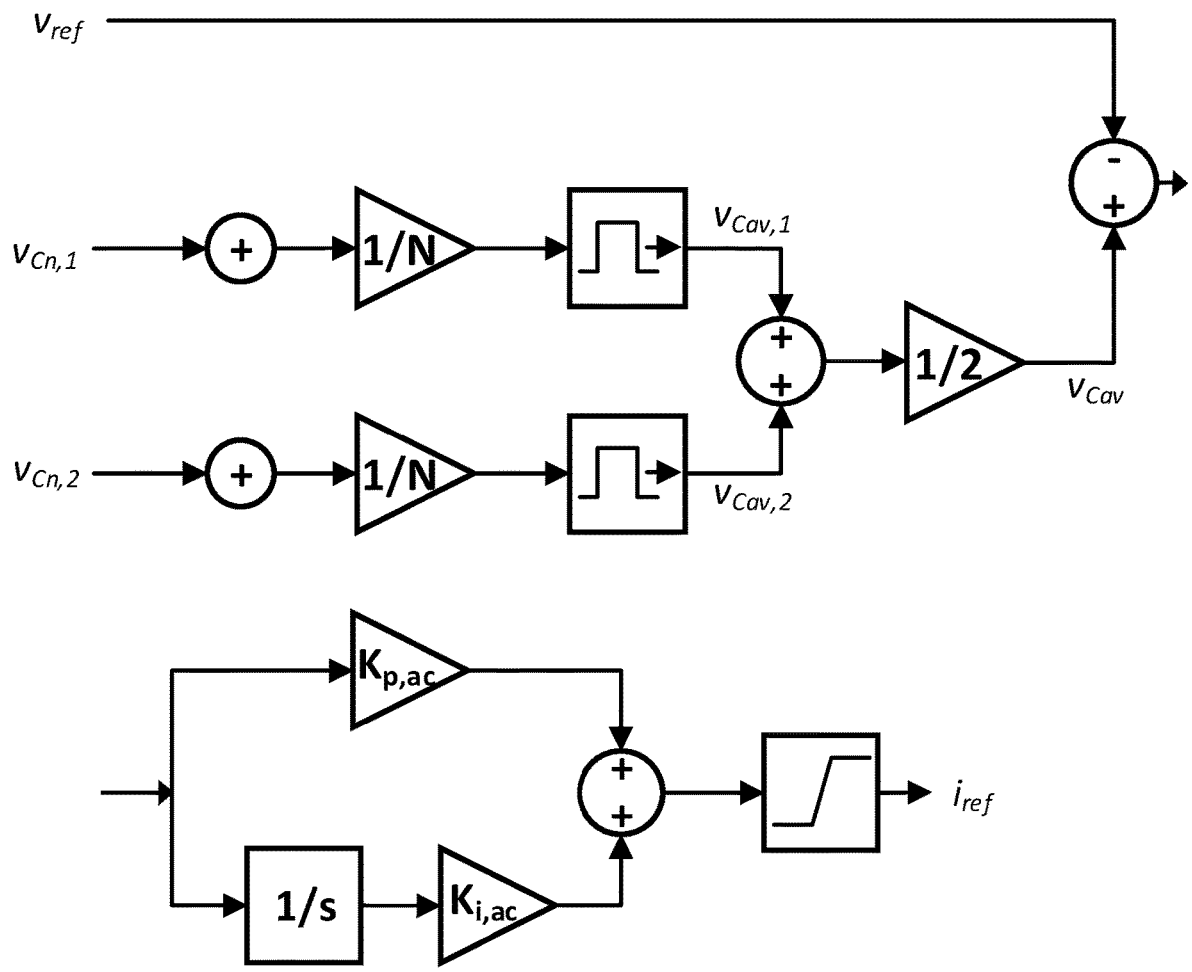

FIG. 17 illustrates a possible approach for implementing the average voltage control part of FIG. 16. The objective of the energy balancing control is to maintain the energy level of the ESEs at a reference level. In case of a basic form where the ESEs are capacitors, the amount of stored energy in the capacitors is directly proportional to their voltage. Therefore, controlling their voltage level also controls their energy level. The capacitor voltages are measured, and an average voltage is obtained by considering both banks. The average voltage control can be implemented in different ways. The capacitor voltages of each DC bank are measured, summed up and divided by the number of SMs (N). After that, a moving average filter is applied for each bank and all the results are summed up and divided by the number of banks (in this example only 2 banks are adopted). The result is the average of the capacitor voltages of all the banks that is directly proportional to the energy stored in the converter. The average voltage is then controlled via the output current (in the considered example the current injected to the grid), by adopting a classical PI controller to compute the output current reference.

Figure 18:
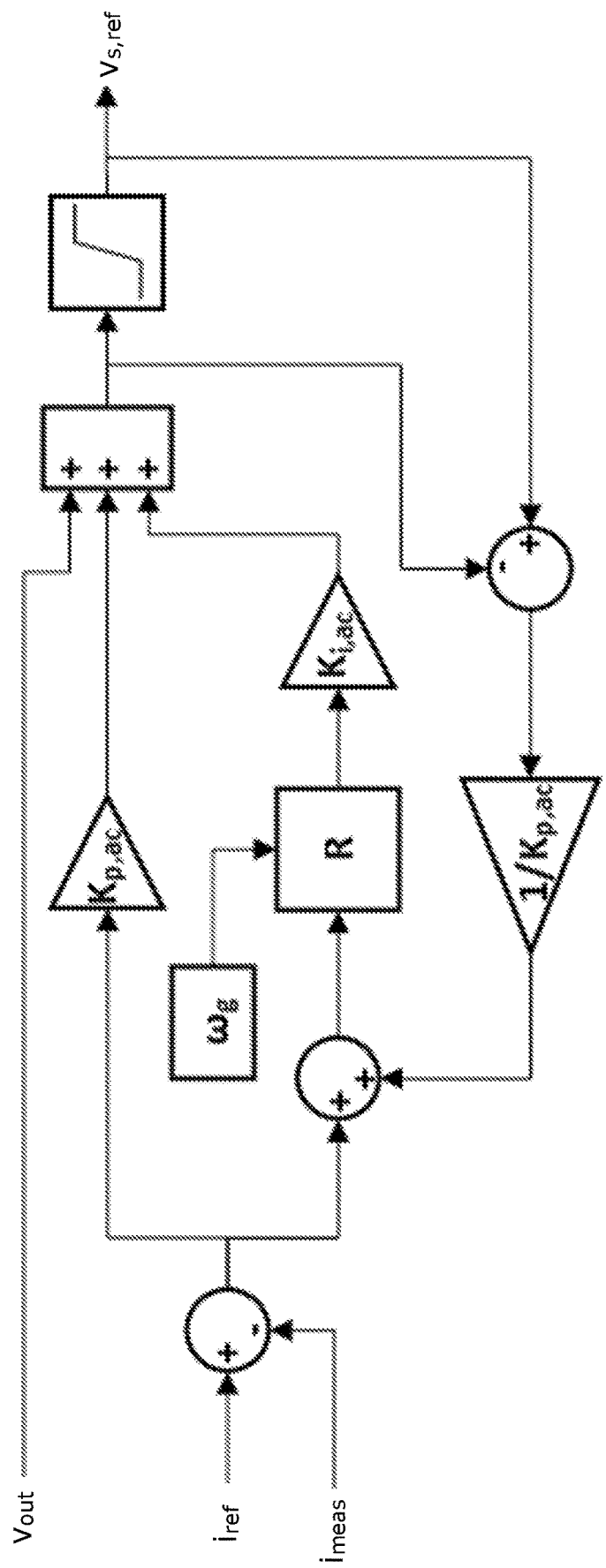

FIG. 18 illustrates a possible approach for the output current control part of the control presented in FIG. 16. This example is a classical output current control and it gives the reference voltage for the DCB connected to the output. The achieved voltage reference is given as input to the modulation technique to generate the gate signals $g_{SWC}$ and $g_{SC}$ for the switches.

Figure 19:
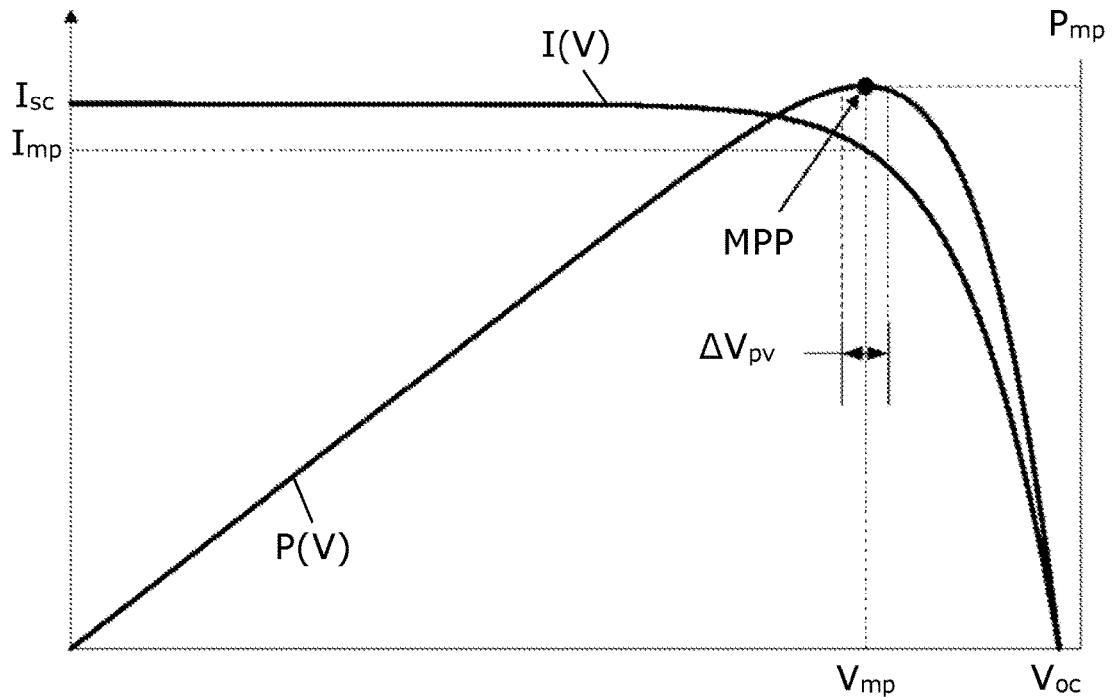
FIG. 19 illustrates maximum power point (MPP) tracking for optimal control of power generation from a source.

FIG. 19 illustrates a graph of current at the vertical axis and voltage at the horizontal axis with an example of MPP tracking, where $P_{mp}$ is the maximum power achieved at the MPP. The MPPT algorithm can adopt the inherent variation of the input (given by the capacitor voltage variation) in order to track the MPP voltage. The threshold values can be set for example equal to ±3% or less of the MPP voltage, that is almost equal to the classical input voltage variation when a perturb and observe method is applied.

Figure 20:
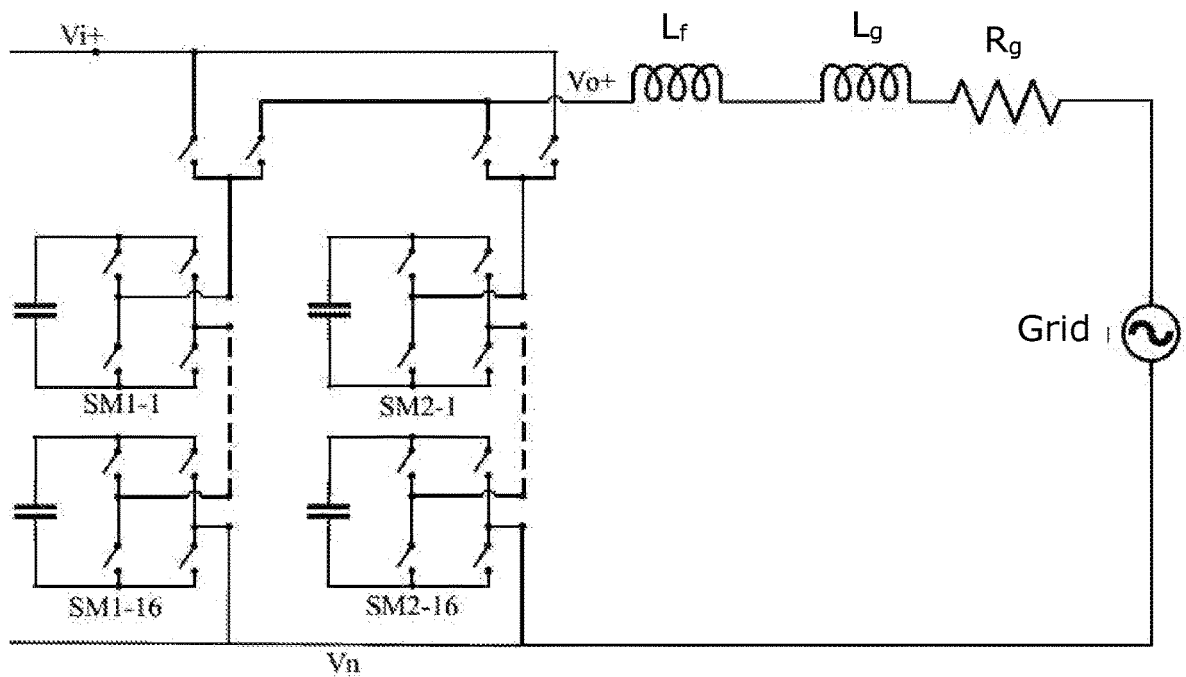
FIG. 20 illustrates an embodiment with an output filter.

FIG. 20 illustrates an embodiment with an output filter comprising an inductor Lf which can be used to limit the harmonics of both voltages and currents. Inductance $L_g$ and resistance $R_g$ indicate grid inductance and resistance. For example, in case the converter is connected to the grid, the grid requirements must be complied with. Due to the reduced harmonic content of the multilevel output voltage the grid filter can be reduced compared to a classical two-level inverter. Further, an input filter can be adopted to filter the input current when the ESEs of the DCB connected to the input are changed. As an example, in case both the input source and the ESEs are voltage sources, e.g. battery or capacitor input, and capacitor ESEs, an inductor may be required on the current path for charging the ESEs.

Figure 21:
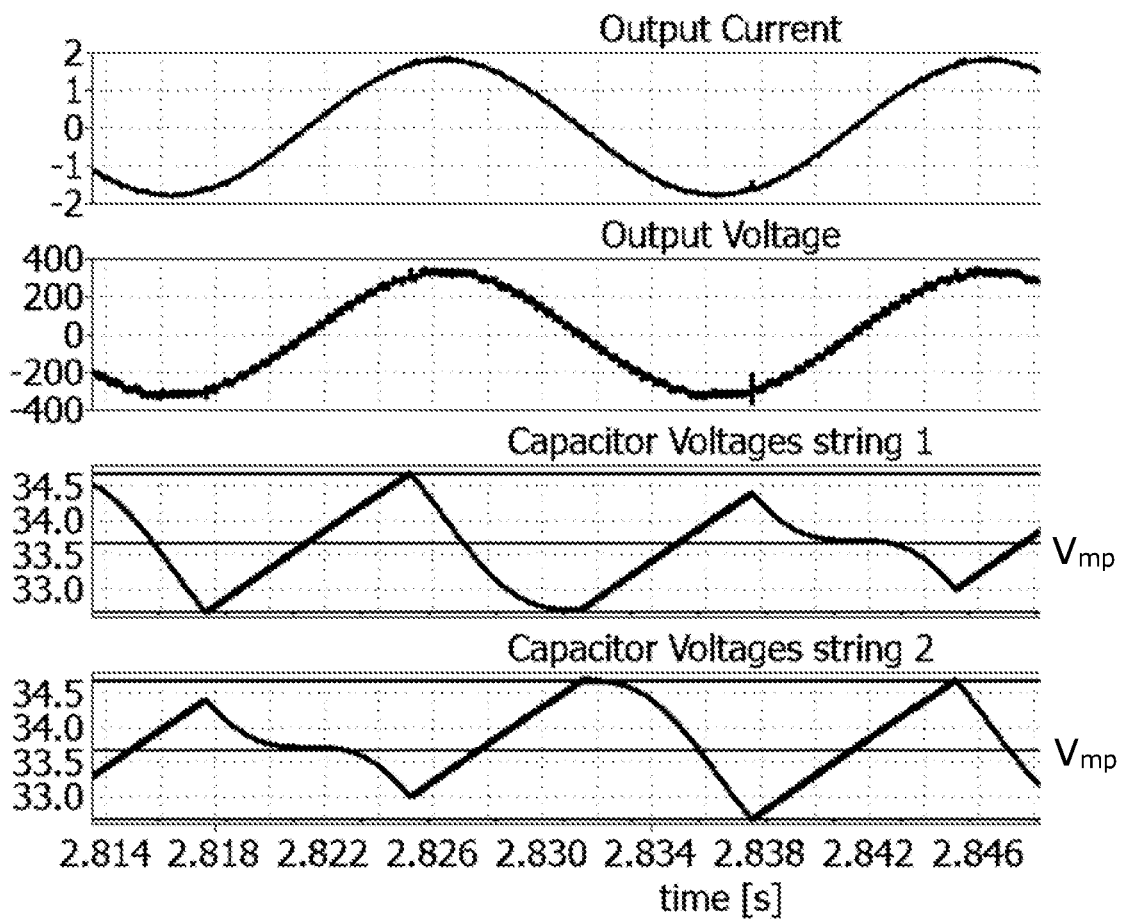
FIG. 21 illustrates simulated results for a 300 W DC-AC converter.

FIG. 21 illustrates a simulation result for a converter embodiment with a PV input source of 300 W and the converter output is connected to a single phase 230 V, 50 Hz grid. The simulated converter has 2 DCBs each with 16 SMs. The ESEs are capacitors and the SM switching circuits are based on full-bridge topologies. An output filter including a 5 mH inductor has been adopted in order to improve the THD of the output current. Nominal MPP voltage $V_{mp}$ has been set to 33.7 V. A tolerance band for the voltage control has been set to ±3% of $V_{mp}$. The upper graphs indicated output current and voltage, while the two lower graphs indicate voltages of the capacitors of the first and second DCBs along with the reference voltage, i.e. $V_{mp}$, and upper and lower threshold. It is seen that the output current closely follows the desired sinusoidal output current. Moreover, the behaviour of the adopted control can be seen. When the first DCB is connected to the input, the capacitor voltages increase. At the same time, the capacitor voltages of the other DCB decrease because they are delivering energy to the output. As soon as the capacitor voltages reach either the upper or lower threshold a swap is performed, and the DCBs are exchanged.

Figure 22:
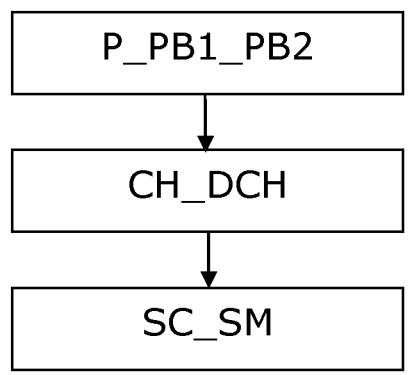
FIG. 22 illustrates steps of a method embodiment.

FIG. 22 illustrates steps of an embodiment of a method for converting an electric input to an electric output by providing P_PB1_PB2 a plurality of DC power banks comprising respective pluralities of series interconnected SMs, wherein each SM comprises electric energy storage elements and a controllable switching circuit for selectively by-passing or connecting the electric energy storage elements. The method involves charging CH_DCH and discharging the plurality of DC power banks in an alternating manner by controlling a controllable switching arrangement with a first control algorithm. Further, the method involves selectively connecting SC_SM a series of one or more of the electric energy storage elements in the DC power banks individually by means of operating the controllable switching circuits according to a second control algorithm.

The proposed converter can be efficiently applied to Photo Voltaic (PV) systems. One or more strings can be connected at the input and an AC voltage can be achieved at the output. Due to possibility of providing a multilevel output, the grid filter can be reduced, and the PV system can be directly connected to the grid through the converter. In this case, the reference voltage for the control is equal to the Maximum Power Point (MPP) voltage evaluated by the Maximum Power Point Tracker (MPPT).

A typical application may require a conversion from continuous to alternate with also a boost in the voltage. Then the converter can be adopted as a DC/AC boost converter by avoiding the use of a DC/DC converter plus an inverter for achieving the right boost and the AC output voltage.

A variation in the topology can allow integrating ESEs in the converter, like batteries. Battery integration in PV converters is advantageous because it allows storing the excess energy when the production is higher than the consumption and providing energy in the other case. This can be obtained in embodiments where one or more ESE capacitors in the SMs are replaced with either a battery cell, a battery pack or a super capacitor. In order to track the MPP, when batteries are integrated in the converter, some changes in the control is preferably applied. Firstly, the battery voltage does not change like the capacitors by making difficult to track the MPP. One possibility to overcome this issue is to connect in series with the battery a capacitor that will handle the voltage difference between the battery voltage and the MPP voltage. Another possibility for battery integration is given by the cascaded hybrid micro-converter shown in FIG. 14. In this case, one or more parallel PV panels can be connected to the input of the micro-converter. This topology allows an easier integration, e.g. with the converter mounted on the back of the PV panel, a local MPPT and a granular battery integration. However, this solution preferably comprises a global controller in order to synchronize all the micro-converters and achieve the desired output voltage, the required output current and the right energy management for the batteries.

In the following, details regarding implementation of the switching sequence of first algorithm will be described, namely switching sequences taking into account a dead-time in the switching sequence.

Figure 23:
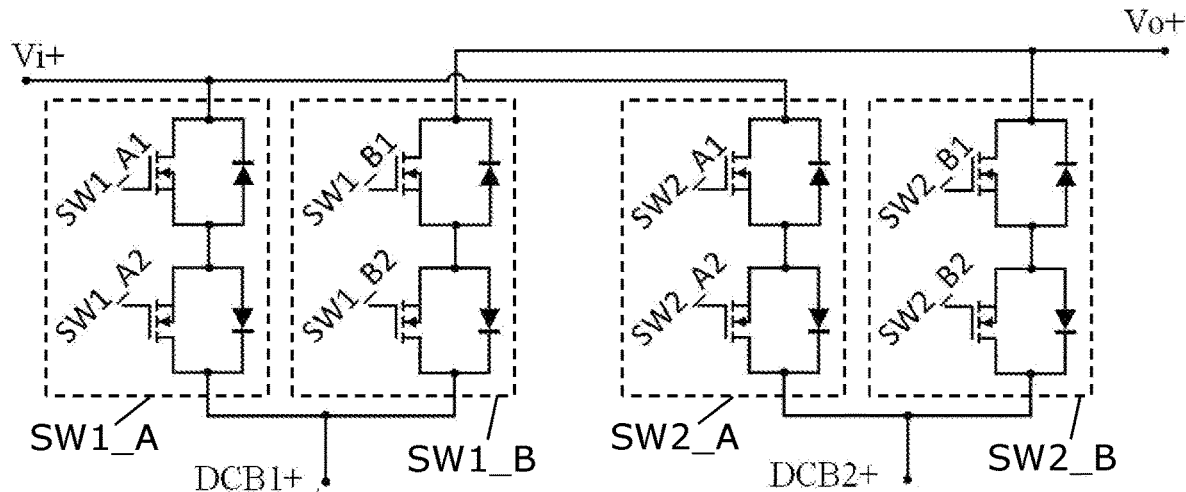
FIG. 23 illustrates an embodiment with bidirectional switches.

FIG. 23 shows a preferred implementation of a switching circuit with four controllable bidirectional switches SW1_A, SW1_B, SW2_A, SW2_B arranged to provide switching of the input terminal Vi+ and output terminal Vo+ between two power bank terminals DCB1+, DCB2+. A first bidirectional switch SW1_A serves for controllable connection of the input terminal Vi+ and a first DC power bank DCB1+. A second bidirectional switch SW1_B serves for establishing controllable electric connection between the output terminal and the first DC power bank DCB1+. A third bidirectional switch SW2_A serves for controllable connection between the input terminal Vi+ and a second DC power bank DCB2+. Finally, a fourth bidirectional switch SW2_B serves for controllable connection between the output terminal Vo+ and the second DC power bank. In the specific example, each of the bidirectional switches are implemented by face-to-face mounted MOSFET switches which include diodes shunting the switches.

The preferred control algorithm for controlling the switching sequence for operating the bidirectional switches SW1_A, SW1_B, SW2_A, SW2_B serves to take into account the dead-time of the switches, i.e. the duration of switching from on-to-off or from off-to-on. Each of the bidirectional SW1_A, SW1_B, SW2_A, SW2_B has four states. E.g. with respect to SW1_A, it has the following states:

1) SW1_A1=ON, SW1_A2=ON, conduction in both directions, assigned value: 2.
2) SW1_A1=ON, SW1_A2=OFF, conduction Vi+ towards DCB1+, assigned value: 1.
3) SW1_A1=OFF, SW1_A2=ON, conduction DCB1+ towards Vi+, assigned value: −1.
4) SW1_A1=OFF, SW1_A2=OFF, no conduction, assigned value: 0.

The same principle applies for the other three bidirectional switches SW1_B, SW2_A, SW2_B.

Figure 24:
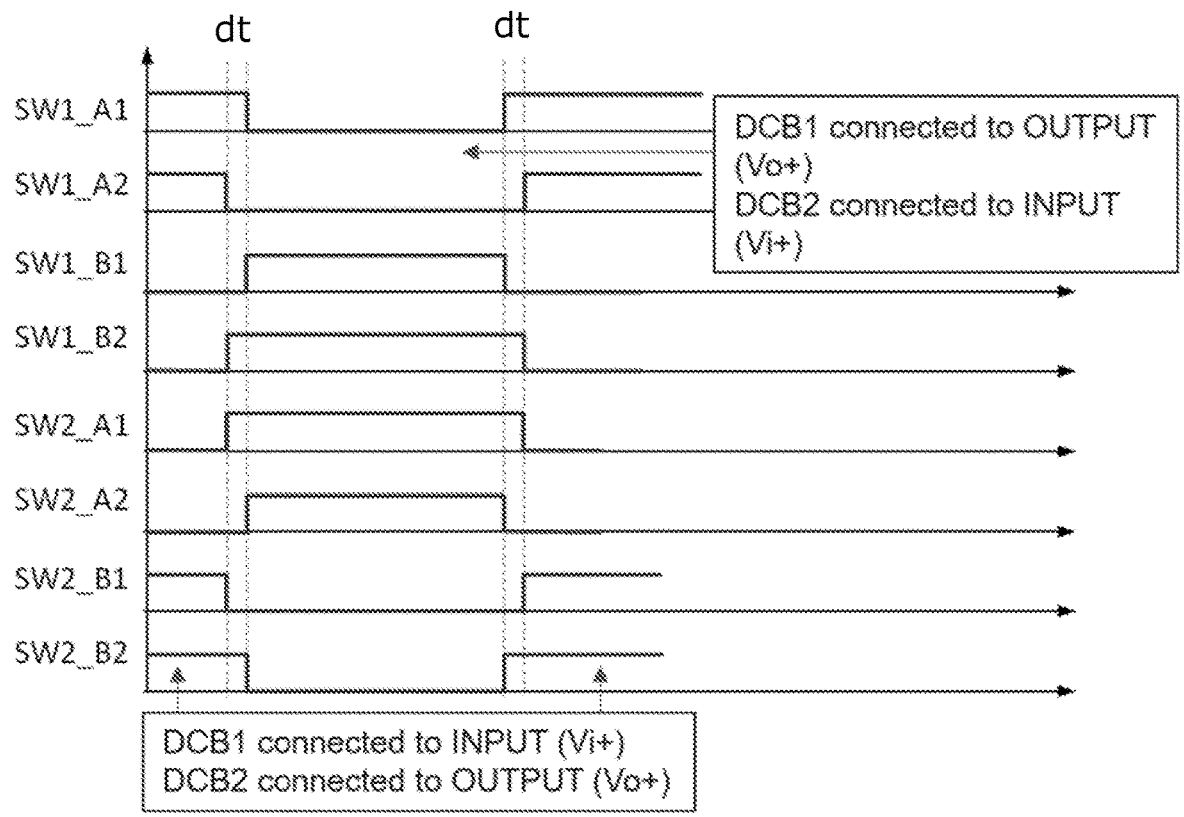
FIG. 24 illustrates a preferred example of a switching sequence for the bidirectional switches of FIG. 23, FIGS. 25, 26a, 26b, and 26c illustrate an example of a full switching sequence flow chart for a converter with two power banks and four bidirectional switches as in FIG. 23.

FIG. 24 shows a preferred switching sequence for the case where the voltage at the input terminal Vi+ is below the voltage at the output terminal Vo+, and where a current at the output is above zero. In FIG. 24 time is on the horizontal axis and voltage is indicated on the vertical axis, and dead-time dt is the time indicated between the vertical dashed lines. With this switching scheme, it is ensured that input and output terminals Vi+, Vo+ at all times have a freewheeling current path.

FIGS. 25, 26a, 26b, 26c show a complete flowchart of all possible operating cases or states of the switching circuit of FIG. 23.

Figure 25:
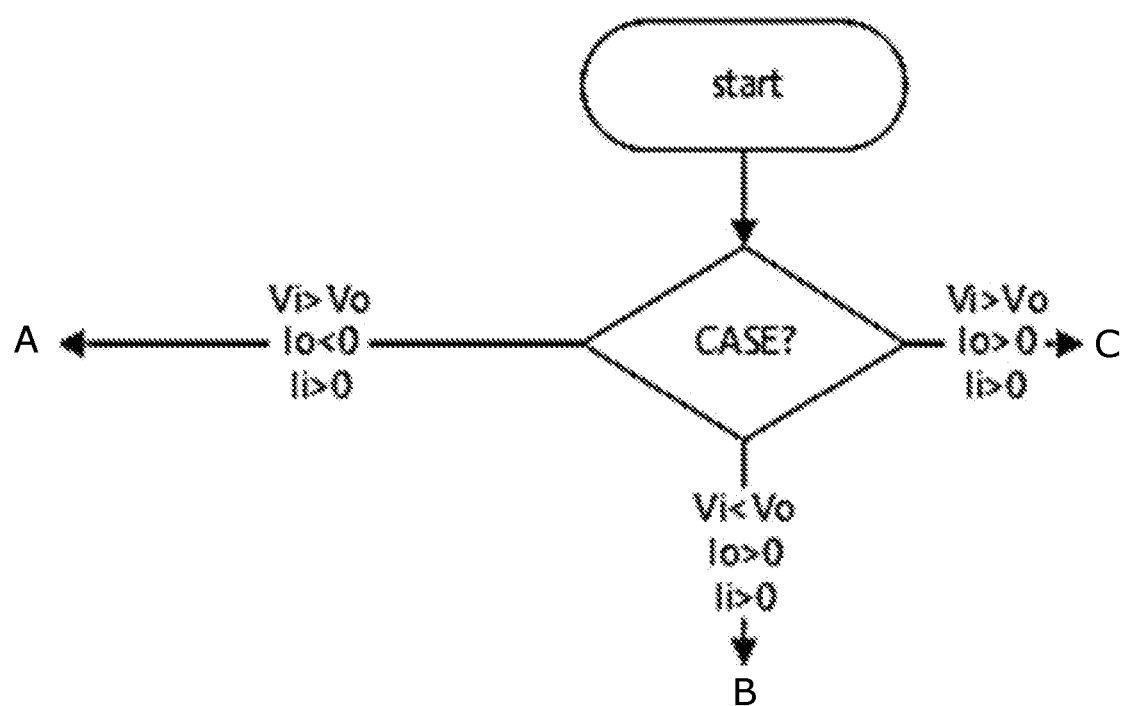

FIG. 25 indicates the initial part of the algorithm where the following cases A, B, C are identified, each being treated with separate sub sequences:

State A: where voltage at the input Vi+ is higher than voltage at the output Vo+, current at output is negative, and current at input is positive.

State B: where voltage at the input Vi+ is lower than voltage at the output Vo+, current at both input and output is positive.

State C: where voltage at the input Vi+ is higher than voltage at the output Vo+, current at both input and output is positive.

Figure 26A:
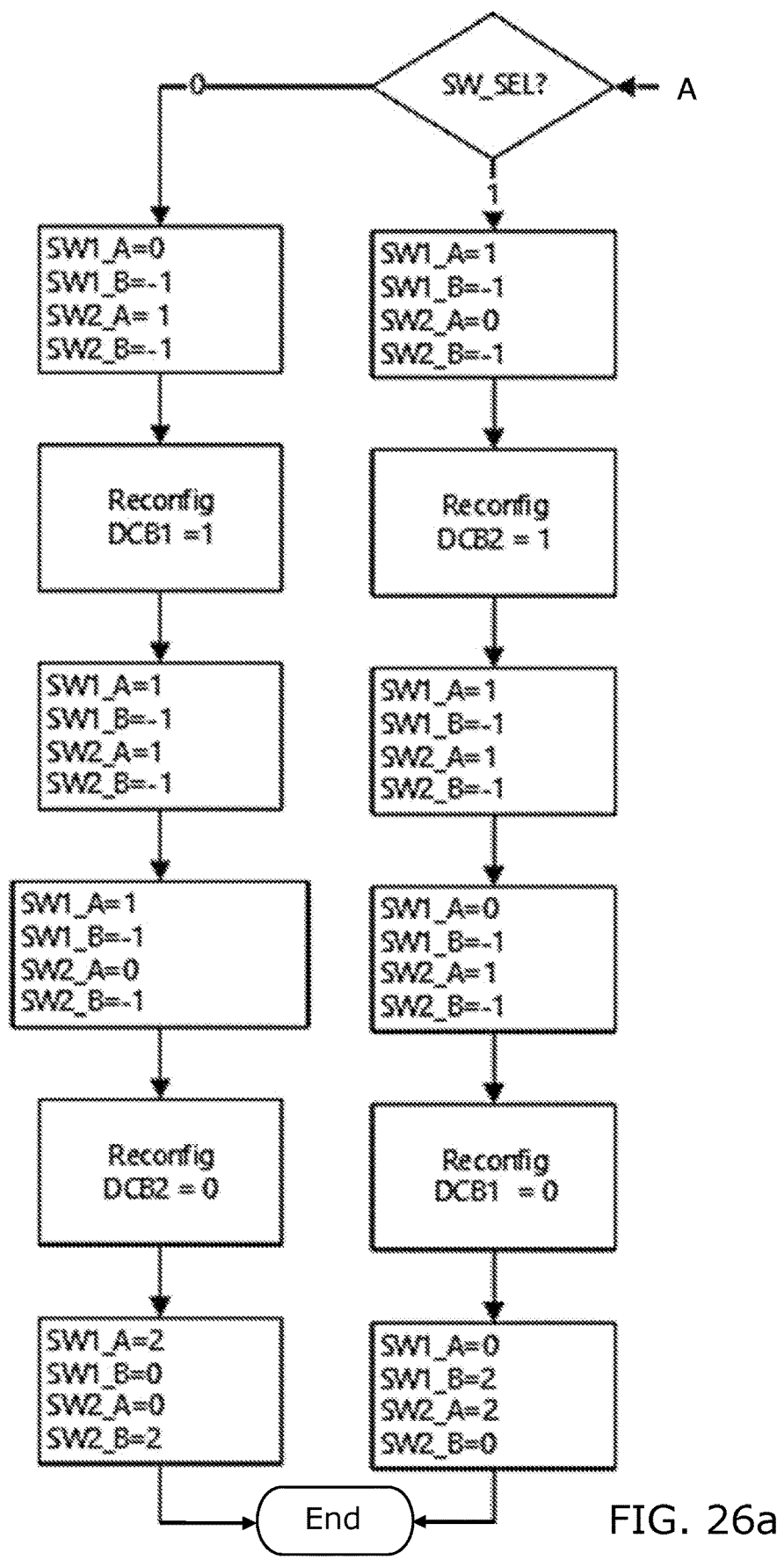
Figure 26B:
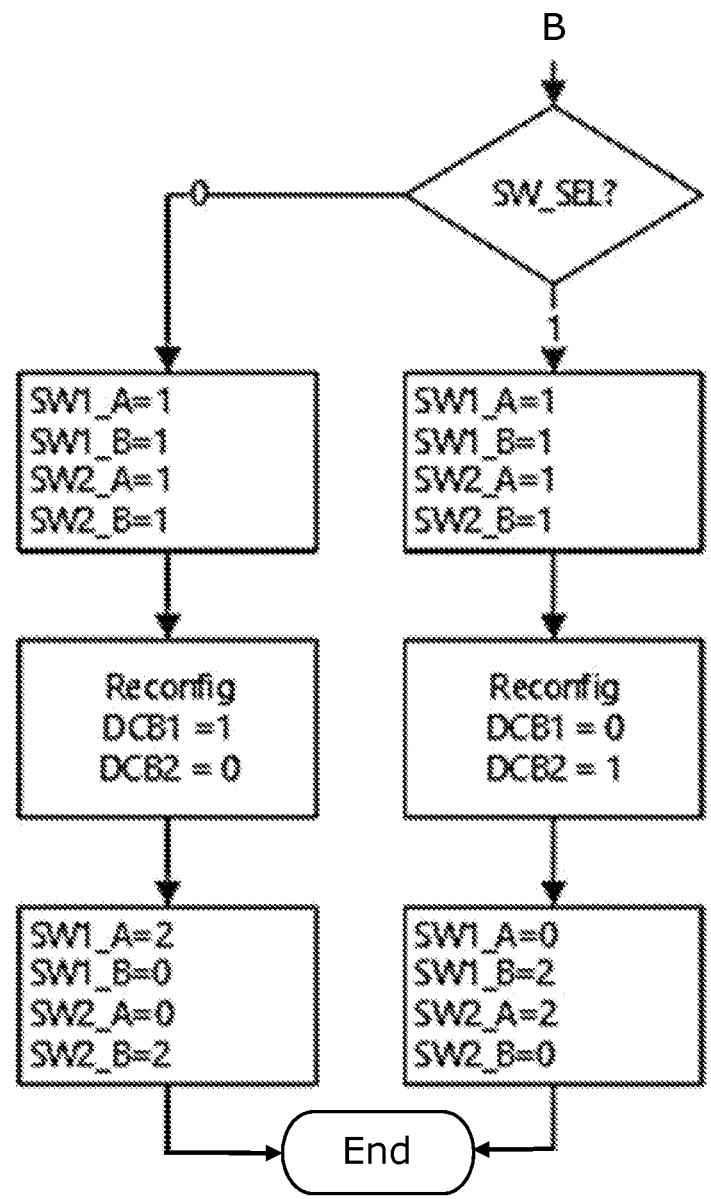
Figure 26C:
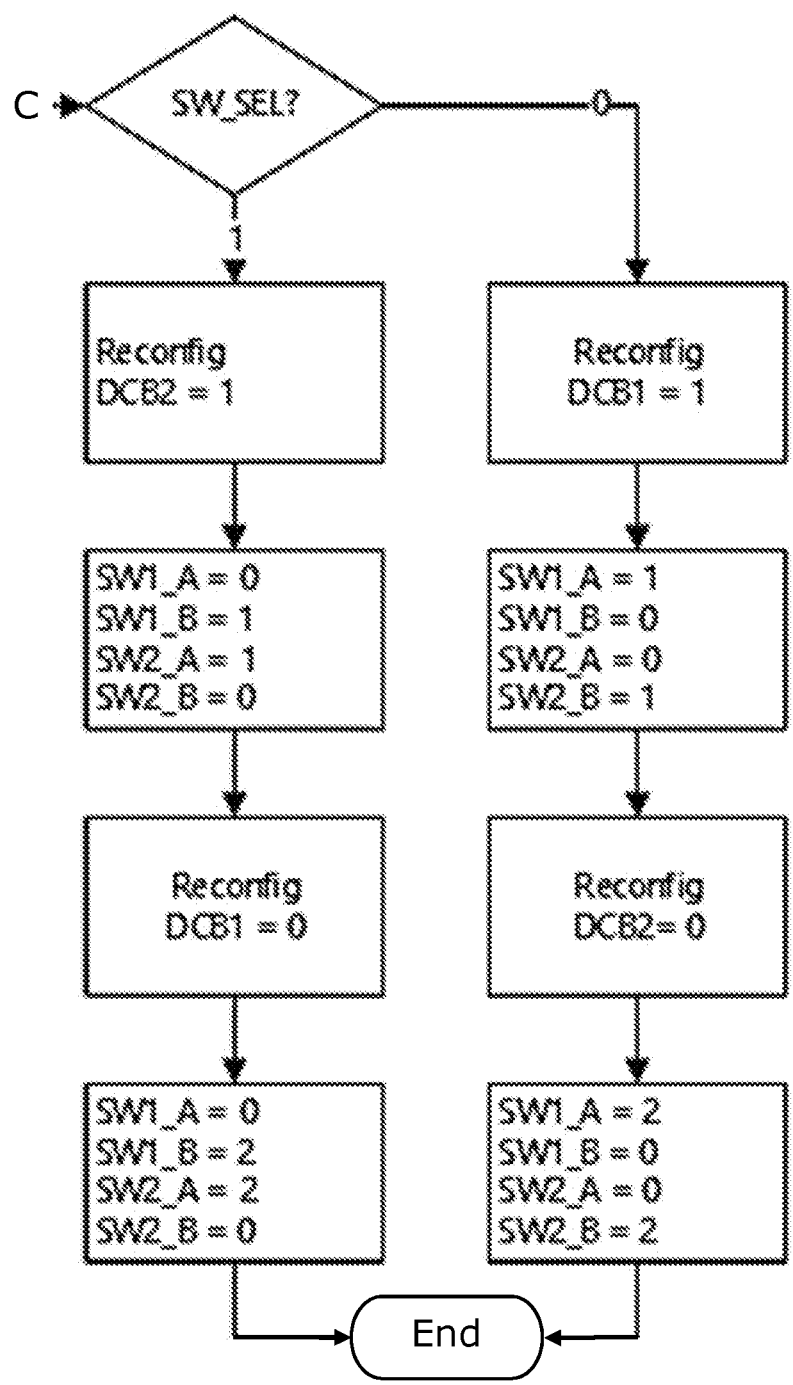

FIGS. 26a, 26b, 26c show the respective sub sequences for the cases A, B, and C. For each of the bidirectional switches SW1_A, SW1_B, SW2_A, SW2_B, the assigned values (−1, 0, 1, and 2) are as explained above in connection with FIG. 23. The cases A, B, C apply for the inverter in operation. If reactive power is to be provided, more cases will need to be added, but not more complicated than the current ones. 'SW_SEL' denotes the state of the swap request signal, i.e. whether DCB1 is connected to input and DCB2 to output, or vice versa. 'Reconfig' denotes reconfiguring the DC power bank such that its voltage matches the input or output terminal to which it is about to be connected.

The flowcharts shown indicate in total the full sequence, however if preferred, it may be possible to optimize the design and eliminate some of the intermediate states.

The above-mentioned principles for the control algorithm for the switching sequence can be implemented e.g. using a Complex Programmable Logic Device (CPLD) or the like.

To sum up: the invention provides an electric converter for converting AC or DC input into an electric AC or DC output. A swap circuit with controllable electric switches serves to selectively swap connection of a plurality of DC power banks (DCBs) between an input terminal and an output terminal, thus selectively connecting the DCBs to an electric source or an electric load. The DCBs are formed as series of interconnected submodules (SMs) each having one or more electric energy storage elements (ESEs) and a switching circuit for selectively by-passing or connecting the ESEs. The ESEs can be capacitors, batteries, super capacitors, or a combination of these. By properly controlling the swap circuit and the switching of the SMs, such as taking into account the dead-time of the electric switches involved, the converter can be used for DC-AC, DC-DC, AC-DC, or AC-AC conversion, allowing multilevel output. It can in some embodiments eliminate the need for an unfolding converter, and the converter provides a rather simple and efficient topology, suitable e.g. for connection of a DC input from a photovoltaic element to an AC electric grid.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An electric converter arranged to convert an electric AC or DC input at an input terminal into an electric AC or DC output at an output terminal,
   a switching arrangement comprising a plurality of controllable electric switches for establishing controllable electric connection between the input terminal and a plurality of first DC power bank terminals and between the output terminal and the plurality of first DC power bank terminals,
   a plurality of DC power banks each having one end connected to the respective first DC power bank terminals and a second end connected to a common minus, wherein the plurality of DC power banks comprise respective pluralities of series interconnected submodules, wherein each submodule comprises one or more electric energy storage elements and a switching circuit comprising at least one controllable electric switch for selectively by-passing or connecting the electric energy storage elements, and
   a control system comprising a processor configured
      to execute a first control algorithm for controlling the switching arrangement to switch between a plurality of states for charging and discharging the plurality of DC power banks in an alternating manner, wherein in a first state the switching arrangement is controlled to connect the input terminal to a first DC power bank terminal, and to connect a second DC power bank terminal to the output terminal, and
      wherein in the second state the switching arrangement is controlled to connect the input terminal to a second DC power bank terminal, and to connect the first DC power bank terminal to the output terminal, and
      to execute a second control algorithm for individually controlling the switching circuits of the submodules of the plurality of DC power banks for selectively connecting a series of one or more of the electric energy storage elements in the plurality of DC power banks individually,
   wherein the first control algorithm provides a switching sequence involving sub sequences serving to take into account a dead-time for the plurality of controllable electric switches of the switching arrangement.

2. The electric converter according to claim 1, wherein the second control algorithm is arranged for controlling the switching circuits of the submodules for the selectively connecting a series of one or more of the electric energy storage elements in the plurality of DC power bands to provide a multilevel voltage output from the plurality of DC power banks.

3. The electric converter according to claim 1, wherein the first and second control algorithms are arranged to control switching operation in response to a voltage at the input terminal.

4. The electric converter according to claim 1, wherein the second control algorithm is arranged to control switching operation of the switching circuits of the submodules in response to a measure of energy stored in the individual electric energy storage elements.

5. The electric converter according to claim 1, wherein the second control algorithm is arranged to adjust switching operation of the switching circuits of the submodules in response to a measure of energy stored in the individual electric energy storage elements, so at to balance ageing and/or variations due to tolerances of the electric energy storage elements.

6. The electric converter according to claim 1, wherein a DC power bank is controlled to provide 5 to 16 different output voltage levels.

7. The electric converter according to claim 1, being arranged to convert: the electric DC input into the electric AC output, the electric DC input into the electric DC output, the electric AC input into the electric DC output, or the electric AC input into the electric AC output.

8. The electric converter according to a claim 1, wherein the switching arrangement is operated at a switching frequency of 0.1 Hz to 10 kHz, such as 0.1 Hz to 3 kHz, such as 10 Hz to 500 Hz, such as 50 Hz to 200 Hz.

9. The electric converter according to claim 1, wherein the switching circuits of the submodules are operated at a switching frequency of 0.1 Hz to 20 kHz.

10. The electric converter according to claim 1, comprising an inductor serving as an electric filter component at an input and/or output and/or between two DC power banks.

11. The electric converter according to claim 1, being dimensioned to output at least an electric power of 10 W, such as at least 100 W, such as at least 500 W, such as at least 1 kW, such as at least 50 kW.

12. The electric converter according to claim 1, wherein the first control algorithm involves a maximum power point tracking algorithm for operating the switching arrangement to obtain an optimal electric power from an electric source connected to the input terminal.

13. The electric converter according to claim 1, comprising a plurality of output terminals.

14. The electric converter according to claim 1, wherein the first control algorithm and the switching circuit is designed to ensure a current path for the input terminal and the output terminal during a dead-time period for the controllable electric switches.

15. The electric converter according to claim 1, wherein the plurality of controllable electric switches comprises:
   a first controllable bidirectional switch for establishing controllable electric connection between the input terminal and a first DC power bank,
   a second controllable bidirectional switch for establishing controllable electric connection between the output terminal and the first DC power bank,
   a third controllable bidirectional switch for establishing controllable electric connection between the input terminal and a second DC power bank, and
   a fourth controllable bidirectional switch for establishing controllable electric connection between the output terminal and the second DC power bank.

16. The electric converter according to claim 15, wherein the first control algorithm involves a switching sequence comprising four states for switching each of the bidirectional switches, for switching between the first and second states, involving a dead-time in the switching sequence.

17. The electric converter according to claim 16, wherein the first control algorithm and the switching circuit are designed to ensure a current path for both the input terminal and the output terminal during a dead-time period.

18. A power electric system comprising an electric converter according to claim 1.

* * * * *